US007057859B2

(12) United States Patent
Kagami et al.

(10) Patent No.: US 7,057,859 B2
(45) Date of Patent: Jun. 6, 2006

(54) MAGNETO-RESISTIVE DEVICE WITH REDUCED SUSCEPTIBILITY TO ION BEAM DAMAGE

(75) Inventors: Takeo Kagami, Tokyo (JP); Kazuki Sato, Tokyo (JP); Takayasu Kanaya, Tokyo (JP); Shunji Saruki, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 20 days.

(21) Appl. No.: 10/600,444

(22) Filed: Jun. 23, 2003

(65) Prior Publication Data

US 2004/0008452 A1      Jan. 15, 2004

(30) Foreign Application Priority Data

Jun. 27, 2002   (JP)   ............................. 2002-188795

(51) Int. Cl.
*G11B 5/39*    (2006.01)
(52) U.S. Cl. ..................................... 360/317; 360/324.1
(58) Field of Classification Search ... 360/324.1–324.2
See application file for complete search history.

(56) References Cited

U.S. PATENT DOCUMENTS 6,344,955 B1 * 2/2002 Sato et al.
6,353,318 B1 * 3/2002 Sin et al. ..................... 324/252
6,545,848 B1 * 4/2003 Terunuma
6,654,212 B1 * 11/2003 Hayakawa ................ 360/324.2
2002/0048126 A1 * 4/2002 Shimazawa ................. 360/320

FOREIGN PATENT DOCUMENTS

JP    A 2001-68759    *    3/2001

OTHER PUBLICATIONS

Nakashio et al., "Longitudinal bias method using a long distance exchange coupling field in tunnel magnetoresistance junctions", Journal of Applied Physics, vol. 89, No. 11, pp. 1-3, 2001.*

* cited by examiner

*Primary Examiner*—A. J. Heinz
(74) *Attorney, Agent, or Firm*—Oliff & Berridge, PLC

(57) ABSTRACT

A magneto-resistive device is improved in characteristics by removing a surface oxide film to reduce the resistance and reducing an ion beam damage. The magneto-resistive device has a magneto-resistive layer which comprises a tunnel barrier layer, an underlying pinned layer, and an overlying free layer. A non-magnetic layer is formed on the free layer for protection. A composite-layer film comprised of an insulating layer and a damage reducing layer is formed in contact with an effective region which is effectively involved in detection of magnetism in the magneto-resistive layer without overlapping with the effective region. The damage reducing layer is made of a material which includes at least one element, the atomic weight of which is larger than that of silicon. The insulating layer and damage reducing layer do not constitute a magnetic domain control layer for applying a biasing magnetic field to the free layer.

28 Claims, 16 Drawing Sheets

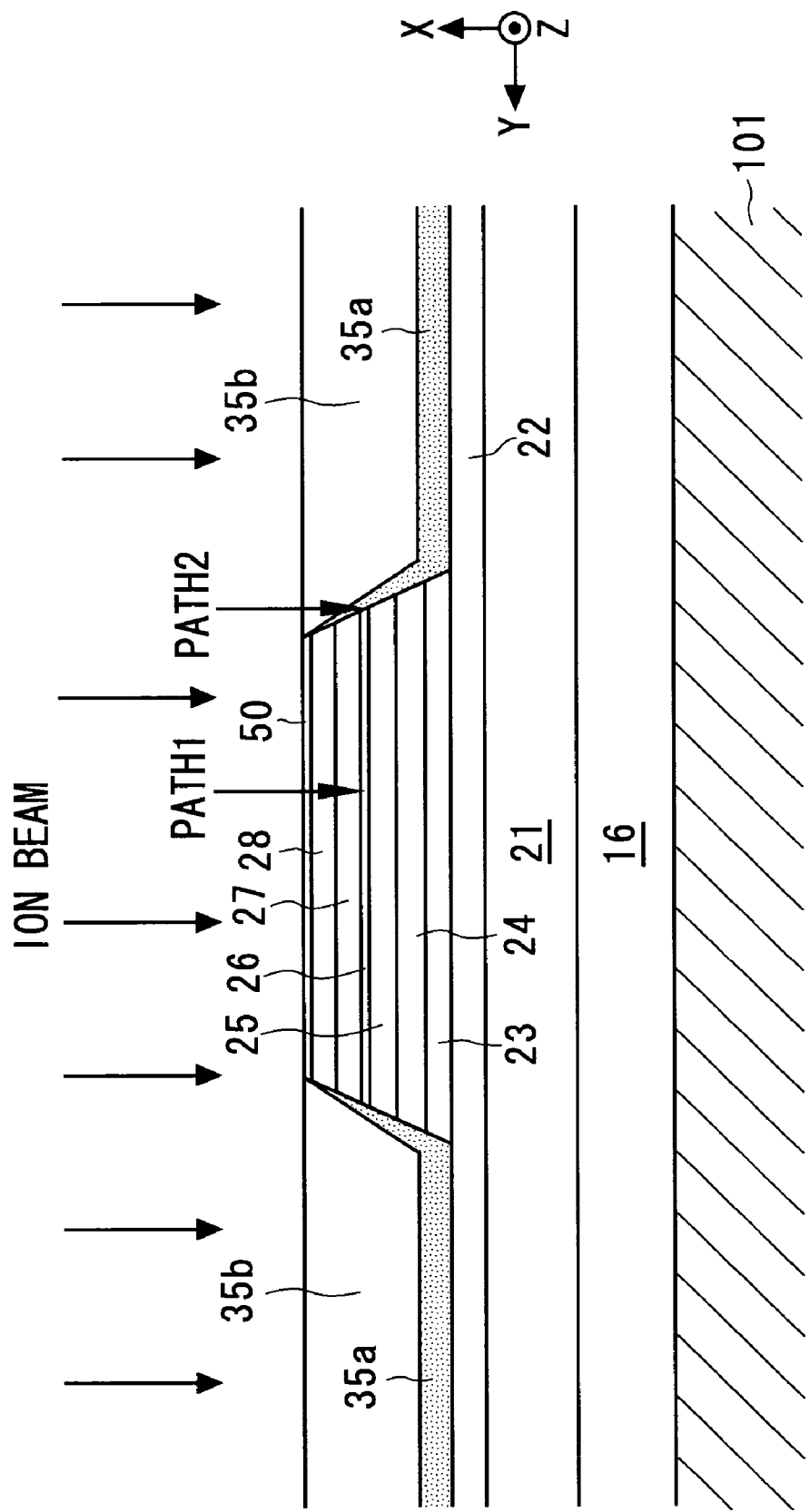

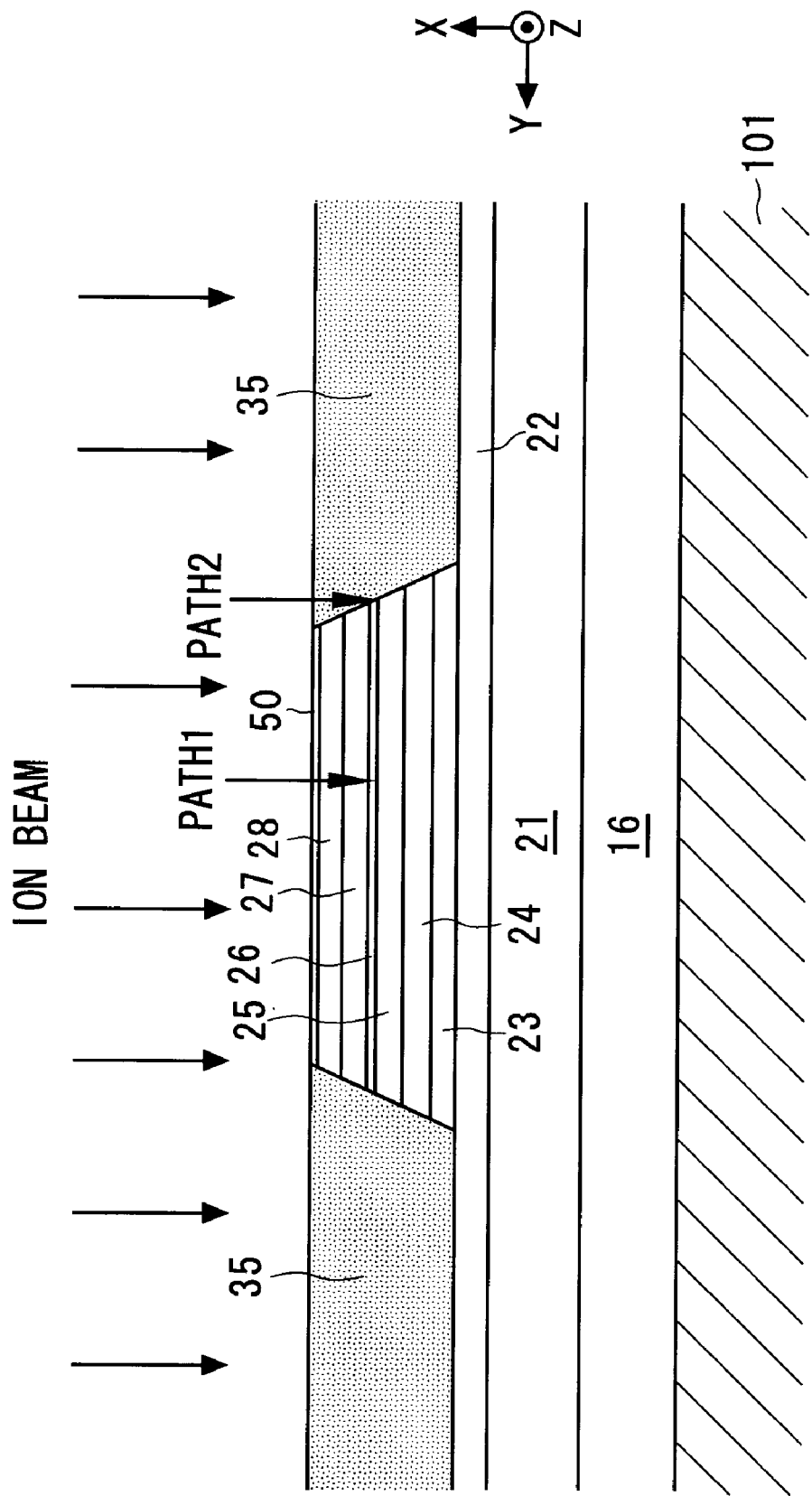

MAGNETO-RESISTIVE DEVICE WITH REDUCED SUSCEPTIBILITY TO ION BEAM DAMAGE

BACKGROUND OF THE INVENTION

The present invention relates to a magneto-resistive device, and a magnetic head, a head suspension assembly and a magnetic disk apparatus using the same.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer films) is used for a magneto-resistive device.

Any type of CPP-based heads has an upper electrode and a lower electrode for supplying a current to a magneto-resistive layer formed on a base, formed on the top (opposite to the base) and on the bottom (close to the base) of the magneto-resistive layer, respectively. Generally, for reasons of manufacturing process, the base formed with the magneto-resistive layer is left in the atmosphere after the magneto-resistive layer is formed and before the upper electrode is formed. In this event, for preventing the top surface of the magneto-resistive layer from being oxidized in the air to damage the characteristics of the magneto-resistive layer such as an MR ratio, a non-magnetic metal layer, referred to as a "cap layer", is previously formed as a protection film on the top surface of the magneto-resistive layer. The non-magnetic metal layer is preferably made of a material insusceptible to oxidation or a material having a low resistance even if it is oxidized. Ru, Rh, Pt, Au, Ta or the like is used for the non-magnetic metal layer. Then, in the CPP-based head, the upper electrode is electrically connected to the magneto-resistive layer through the non-magnetic metal layer.

A head utilizing a spin valve film or a TMR film is applied with a biasing magnetic field to a free layer in a track width direction, whether it is in CIP structure or in CPP structure, in order to suppress Barkhausen noise. Generally, in the CIP structure, a resist mask used for milling for defining the track width is utilized as it is to form hard magnetic films made of CoCrPt or the like adjacent to both sides of a magneto-resistive layer as magnetic domain control films. This is referred to as an "abutted structure". Like a CIP-GMR head, the CPP structure also employs the abutted structure to apply a biasing magnetic field to a free layer (see, for example, JP-A-2000-30223 corresponding to U.S. Pat. No. 6,344,955, JP-A-2001-14616 corresponding to U.S. Pat. No. 6,545,848, and the like). In this way, in any type of head, the biasing magnetic field is generally applied to the free layer through the abutted structure.

On the other hand, an article by Nakashio et al., entitled "Longitudinal bias method using a long distance exchange coupling field in tunnel magnetoresistance junctions", Journal of Applied Physics, Vol. 89, No. 11 (Jun. 1, 2001), pp 1–3 and JP-A-2001-68759 have proposed magneto-resistive elements (TMR elements) which have an antiferromagnetic layer made of IrMn or the like laminated on a free layer of a magneto-resistive layer as a magnetic domain control film for applying a biasing magnetic field to the free layer. In this TMR element, a non-magnetic metal layer made of Cu or the like is formed on the free layer on a tunnel barrier layer, and the antiferromagnetic layer is formed on the non-magnetic metal layer. According to this TMR element, an exchange bias magnetic field of the antiferromagnetic layer is applied to the free layer in the track width direction through the non-magnetic metal layer as a biasing magnetic field. As a result, the magnetic domain of the free layer is controlled to suppress the Barkhausen noise without fixing the magnetization direction of the free layer.

Conventionally, in a magnetic head which employs the abutted structure, an insulating layer made of $Al_2O_3$ or $SiO_2$ is disposed not only near an end face of a magneto-resistive layer but also over a region quite far away from the end face on the side of the magneto-resistive layer opposite to a magnetic recording medium side (ABS side), on which the hard magnetic film constituting the magnetic domain control layer for applying a biasing magnetic field to a free layer is not disposed. In a magnetic head which employs the structure disclosed in the above cited article and JP-A-2001-68759, since the antiferromagnetic layer is laminated on the magneto-resistive layer as a magnetic domain control layer for applying a biasing magnetic field to the free layer, an insulating layer made of $Al_2O_3$ or $SiO_2$ is formed not only near an end face of the magneto-resistive layer but also over a region far away from the end face over the entire periphery other than the side of the magneto-resistive layer closer to the magnetic recording medium side (ABS side).

In the CPP-based head such as the TMR head, the magneto-resistive layer is supplied with a current through the upper electrode and non-magnetic metal layer (cap layer), so that a good electrical contact must be maintained between the upper electrode and non-magnetic metal layer to reduce the resistance. However, when the base formed with the magneto-resistive layer and non-magnetic metal layer is left in the atmosphere, the surface of the non-magnetic metal layer is oxidized in the air. Even if a material insusceptible to oxidization is used for the non-magnetic metal layer, a slight oxide film or surface adsorption layer is inevitable. Thus, if another layer such as an upper electrode is formed on the oxidized non-magnetic metal layer, a good electrical contact cannot be maintained between the upper electrode and non-magnetic metal layer. To solve this inconvenience, the surface oxide film is removed from the non-magnetic metal layer by dry etching (such as sputter etching, ion beam etching or the like) within the same vacuum chamber in which the upper electrode and the like are deposited, prior to the formation of another layer such as the upper electrode on the non-magnetic metal layer.

However, when the surface oxide film is fully dry etched for a lower resistance during a removing step, the magneto-resistive layer is seriously damaged by an ion beam. For example, with the TMR head, an extremely thin tunnel barrier layer (for example, 1 mm or less in thickness) is seriously damaged by the ion beam to cause an extreme reduction in MR ratio and occasional failure in a utilization as a magnetic head.

SUMMARY OF THE INVENTION

It is an object of the present invention to provide a magneto-resistive device which has improved characteristics by removing a surface oxide film on a non-magnetic metal layer to reduce the resistance while limiting a damage caused by an ion beam, and a magnetic head, a head suspension assembly and a magnetic disk apparatus using the same.

The result of a research made by the inventors revealed that there is a path which accesses an end face of a magneto-resistive layer (for example, an end face of a tunnel barrier layer in a TMR head), as a path which gives an ion beam damage to the magneto-resistive layer during the aforementioned surface oxide film removing step. It was also revealed that in a conventional magneto-resistive device, an ion beam damage reduction effect is low in an insulating layer made of $Al_2O_3$ or $SiO_2$ disposed near a predetermined end face of the magneto-resistive layer, and the ion beam damage is problematic particularly from the end face. Based on such new knowledge, the inventors conceived a reduction in the ion beam damage to the magneto-resistive layer by disposing a material having a higher ion beam damage reduction effect than $Al_2O_3$ and $SiO_2$ on this path, and confirmed the effect by experiments.

Now, description will be made on how to determine whether a material has a high or low ion beam damage reduction effect. Two layers are formed of two materials in the same thickness, respectively. Each of the layers is formed on one side with a layer of interest (for example, a tunnel barrier layer) which can be damaged by an ion beam to cause a problem. When the two layers made of the two materials are irradiated with an ion beam having the same energy directly or through the same predetermined layer from the side opposite to the layer of interest, the material on which the layer of interest remains undamaged or which is less susceptible to degradation of characteristics is said to have a higher ion beam damage reduction effect than the other material. Generally, it is thought that a material including an element having larger atomic weight has a higher ion beam damage reduction effect. It is thought that the ion beam damage occurs in the following manner: an ion beam such as Ar passes through the material and directly accesses the layer of interest to destroy the layer of interest, or the energy of the ion beam propagates through a crystal lattice in the form of lattice vibration to destroy the layer of interest, or the atoms in crystals within the material transmit the energy of the ion beam in a pileup fashion to destroy the layer of interest.

The present invention has been devised as a result of the research made by the inventors as described above. A magneto-resistive device according to a first aspect of the present invention includes a magneto-resistive layer formed on one surface side of a base and including a free layer, and a single-layer film formed to be in contact with an effective region effectively involved in detection of magnetism in the magneto-resistive layer without overlapping with the effective region. The single-layer film is formed of an insulating material made of an oxide or a nitride including at least one element, and the atomic weight of the at least one element is larger than that of silicon. The single-layer film excludes a layer for applying a biasing magnetic field to the free layer.

An ion beam damage reducing effect higher than $Al_2O_3$ and $SiO_2$ can be provided by an insulating material made of an oxide or a nitride including at least one element, the atomic weight of which is larger than that of silicon. Thus, in the first aspect, the single-layer film formed of an insulating material made of an oxide or a nitride including at least one element, the atomic weight of which is larger than that of silicon, is formed in the aforementioned relationship with respect to the effective region of the magneto-resistive layer, so that the single-layer film reduces a damage of an ion beam which accesses at least a part of region of the end face of the effective region of the magneto-resistive layer, as compared with the conventional magneto-resistive device. It is therefore possible, according to the first aspect, to remove the surface oxide film to reduce the resistance, reduce the ion beam damage, and consequently improve the characteristics of the device. Since the single-layer film is made of an insulating material, the respective layers of the magneto-resistive layer will not be short-circuited to one another.

A magneto-resistive device according to a second aspect of the present invention includes a magneto-resistive layer formed on one surface of a base and including a free layer, and a composite-layer film formed to be in contact with an effective region effectively involved in detection of magnetism in the magneto-resistive layer without overlapping with the effective region. A layer in the composite-layer film being located closest to the base is formed of an insulating material made of an oxide or a nitride including at least one element, and the atomic weight of the at least one element is larger than that of silicon. The composite-layer film excludes a layer for applying a biasing magnetic field to the free layer.

In the second aspect, the composite-layer film is formed in the aforementioned relationship with respect to the effective region of the magneto-resistive layer, and the layer of the composite-layer film closest to the base is made of an insulating material made of an oxide or a nitride including at least one element, the atomic weight of which is larger than that of silicon, so that the composite-layer film reduces a damage of an ion beam which accesses at least a part of region of the end face of the effective region of the magneto-resistive layer, as compared with the conventional magneto-resistive device, as is the case in the first aspect. It is therefore possible, according to the second embodiment, to provide similar advantages to the first aspect. Since the layer of the composite-layer film closest to the base is formed of an insulating material, the respective layers of the magneto-resistive layer will not be short-circuited to one another, even if the remaining layers of the composite-layer film are made of conductors or semiconductors.

In a magneto-resistive device according to a third aspect of the present invention, the insulating material is at least one selected from a group consisting of $TiO_2$, $MgO$, $Ta_2O_5$ and $WO_3$ in the first and second aspects. While the third aspect enumerates examples of the insulating material, the insulating material is not limited to these examples.

A magneto-resistive device according to a fourth aspect of the present invention includes, a magneto-resistive layer formed on one surface of a base and including a free layer, and a composite-layer film formed to be in contact with an effective region effectively involved in detection of magnetism in the magneto-resistive layer without overlapping with the effective region. A layer in the composite-layer film being located closest to the base is formed of an insulating material. At least one layer in the composite-layer film except for the layer being located closest to the base is made of a predetermined material including at least one element, and the atomic weight of the at least one element is larger than that of silicon. The composite-layer film excludes a layer for applying a biasing magnetic field to the free layer.

In the fourth aspect, the composite-layer film is formed in the aforementioned relationship with respect to the effective region of the magneto-resistive layer, and at least one layer of the composite-layer film other than the layer closest to the base is formed of the predetermined material including at least one element, the atomic weight of which is larger than that of silicon, so that the composite-layer film reduces a damage of an ion beam which accesses at least a part of region of the end face of the effective region of the magneto-resistive layer, as compared with the conventional magneto-resistive device, as is the case in the first aspect. It is therefore possible, according to the fourth aspect, to provide similar advantages to the first aspect. Since the layer of the composite-layer film closest to the base is made of an insulating material, the respective layers of the magneto-resistive layer will not be short-circuited to one another, even if the remaining layers of the composite-layer film is made of conductors or semiconductors.

In a magneto-resistive device according to a fifth aspect of the present invention, the predetermined material is at least one selected from a group consisting of P, Ti, V, Cr, Mn, Fe, Co, Ni, Cu, Zn, Ga, Ge, As, Zr, Nb, Mo, Tc, Ru, Rh, Pt, Ag, Cd, In, Sn, Sb, Hf, Ta, W, Re, Os, Ir, Au, Hg, Tl, Pb, Bi, and non-magnetic metals and non-magnetic semiconductors including any one or more of the elements in the fourth aspect. The fifth aspect enumerates examples of the predetermined material.

In a magneto-resistive device according to a sixth aspect of the present invention, the predetermined material is at least one selected from a group consisting of $TiO_2$, $MgO$, $Ta_2O_5$ and $WO_3$ in the fourth aspect. The sixth aspect also enumerates examples of the predetermined material.

In a magneto-resistive device according to a seventh aspect of the present invention, the effective region is a region in which a current flows in a direction substantially perpendicular to a film surface of the magneto-resistive layer in the magneto-resistive layer, in any of the first to sixth aspects. While the seventh aspect enumerates an example of the effective region, the insulating material is not limited to this example and may be any region as long as it is effectively involved in the detection of magnetism in the first to sixth aspects.

A magneto-resistive device according to a eighth aspect of the present invention further includes, in any of the first to seventh aspects, a non-magnetic metal layer having one or more layers formed on the magneto-resistive layer on the side opposite to the base, wherein the non-magnetic metal layer is formed such that the non-magnetic layer substantially exactly overlaps with at least the layer in the magneto-resistive layer furthest away from the base.

According to the eighth aspect, the non-magnetic metal layer is preferable because it protects the magneto-resistive layer. In addition, according to the eighth aspect, when at least the layer in the magneto-resistive layer furthest away from the base is milled into a desired shape, the non-magnetic metal layer can be simultaneously milled, thereby achieving so-called self-alignment. This is preferable because the manufacturing process is simplified.

In a magneto-resistive device according to a ninth aspect of the present invention, the magneto-resistive layer includes, in any of the first to eighth aspects, a tunnel barrier layer formed on one surface side of the free layer, a pinned layer formed on one surface side of the tunnel barrier layer opposite to the free layer, and a pin layer formed on one surface side of the pinned layer opposite to the tunnel barrier layer. The single-layer film or composite-layer film is in contact with an end face of the tunnel barrier layer.

The ninth aspect shows an example in which the first to eighth aspects is applied to a TMR device. In the TMR device, as the tunnel barrier layer is made extremely thin in order to reduce the resistance of the magneto-resistive layer itself, the influence of the damage by an ion beam is significant. Therefore, when the first to eighth aspects are applied to a TMR device as shown in the ninth aspect, resulting effects are remarkable. However, the first to eighth aspect are not limited to the TMR device but can be applied as well to a CPP-GMR device and the like.

A magnetic head according to a tenth aspect of the present invention includes a base, and the magneto-resistive device according to any of the first to ninth aspects, supported by the base.

Since the magnetic head according to the tenth aspect employs the magneto-resistive device in any of the first to ninth aspects, the magnetic head can ensure a good electric contact between the electrode and non-magnetic metal layer, while preventing the oxidization on the surface of the magneto-resistive layer by using the non-magnetic metal layer, and reducing a damage to the magneto-resistive layer by an ion beam to consequently improve the characteristics of the device.

In a magnetic head according to a eleventh aspect of the present invention, the single-layer film or the composite-layer film is in contact with the effective region on at least one side of the effective region opposite to a magnetic recording medium.

As described above, both in conventional magnetic heads which employ the abutted structure and in conventional magnetic heads which employ the structures disclosed in the aforementioned article and JP-A-2001-68759, an insulating layer made of $Al_2O_3$ and $SiO_2$ is formed not only near the end face of the magneto-resistive layer but also over a region quite far away from there on the side of the magneto-resistive layer opposite to the magnetic recording medium side (ABS side). The magnetic head according to the eleventh aspect is quite effective because it can reduce the ion beam damage to the end face of the magnetic metal layer opposite to the magnetic recording medium.

A head suspension assembly according to a twelfth aspect of the present invention includes the magnetic head according to the tenth or eleventh aspect, and a suspension for supporting the magnetic head mounted near a leading end thereof.

According to the twelfth aspect, since the head suspension assembly employs the magnetic head according to the tenth or eleventh aspect, it is possible to increase the recording density of a magnetic disk apparatus and the like.

A magnetic disk apparatus according to a thirteenth aspect of the present invention includes the head suspension assembly according to the twelfth aspect, an arm for supporting the head suspension assembly, and an actuator for moving the arm to position the magnetic head. According to the thirteenth aspect, since the magnetic disk apparatus employs the magnetic head according to the twelfth aspect, it is possible to increase the recording density

BRIEF DESCRIPTION OF THE DRAWINGS

FIG. 9 is a diagram schematically illustrating a further step which makes up the wafer process in the method of manufacturing the magnetic head illustrated in FIGS. 1 to 5;

FIG. 14 is a diagram schematically illustrating a further step which makes up the wafer process in the method of manufacturing the magnetic head illustrated in FIGS. 11 and 12;

DETAILED DESCRIPTION OF THE EMBODIMENTS

In the following, a magneto-resistive device, and a magnetic head, a head suspension assembly and a magnetic disk apparatus using the magneto-resistive device according to the present invention will be described with reference to the accompanying drawings.

First, a magnetic head according to a first embodiment of the present invention will be described with reference to FIGS. 1 to 5.

Figure 1:
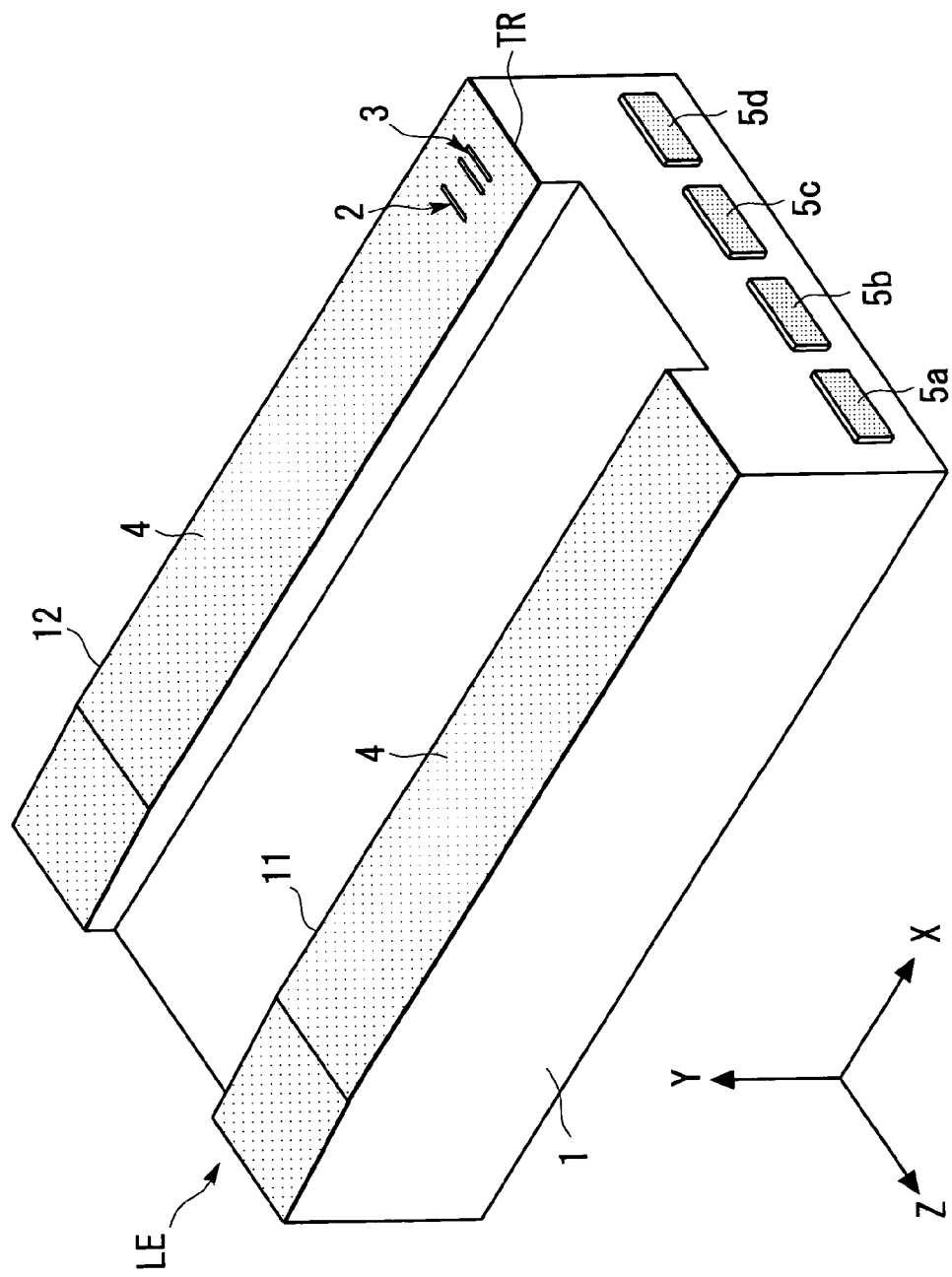
FIG. 1 is a general perspective view schematically illustrating a magnetic head according to a first embodiment of the present invention.
Figure 2:
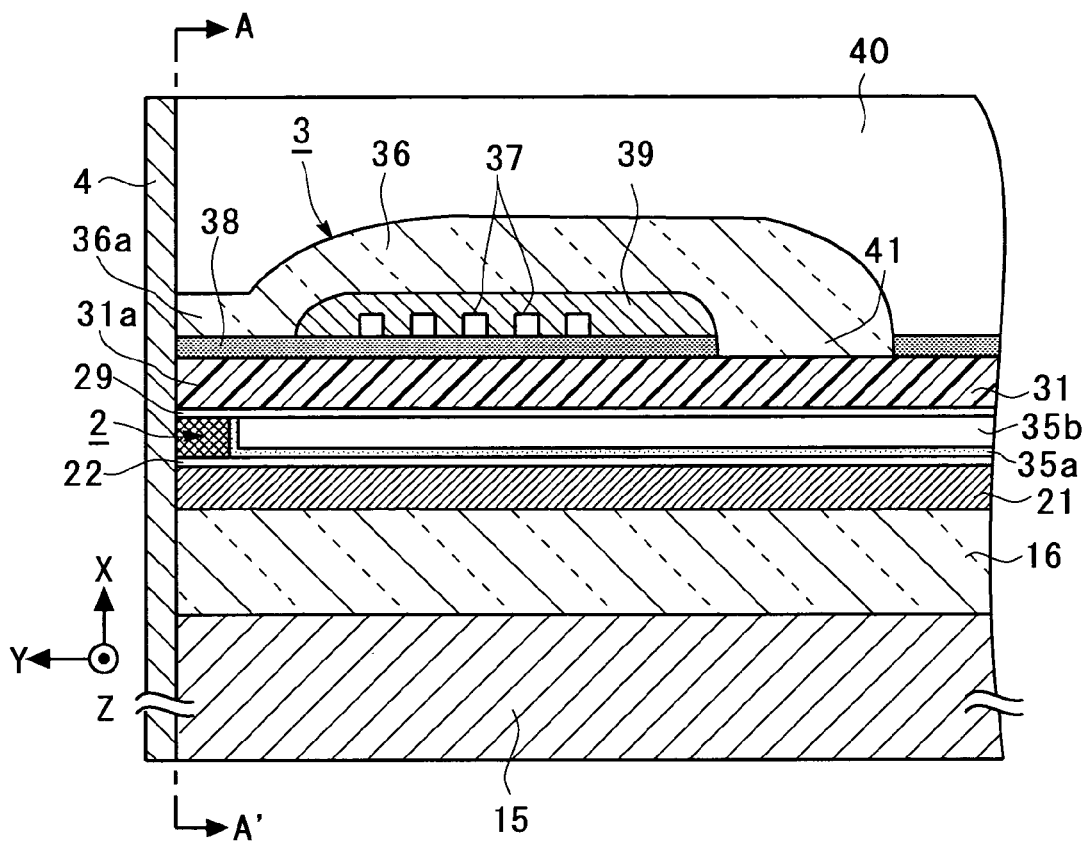
FIG. 2 is an enlarged cross-sectional view schematically illustrating a portion of a TMR device and an inductive magnetic transducing device in the magnetic head illustrated in FIG. 1.
Figure 3:
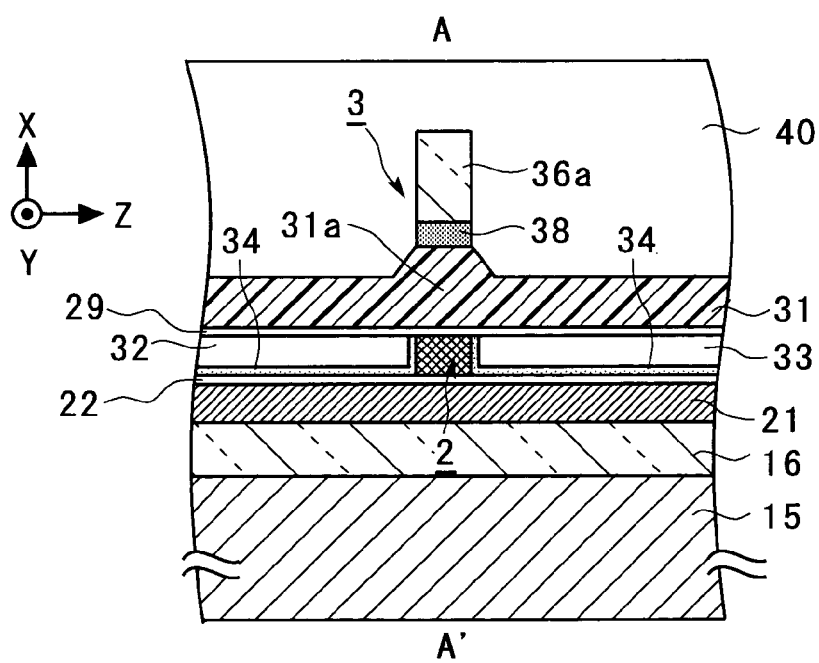
FIG. 3 is a general sectional view taken along a line A–A' indicated by arrows in FIG. 2.
Figure 4:
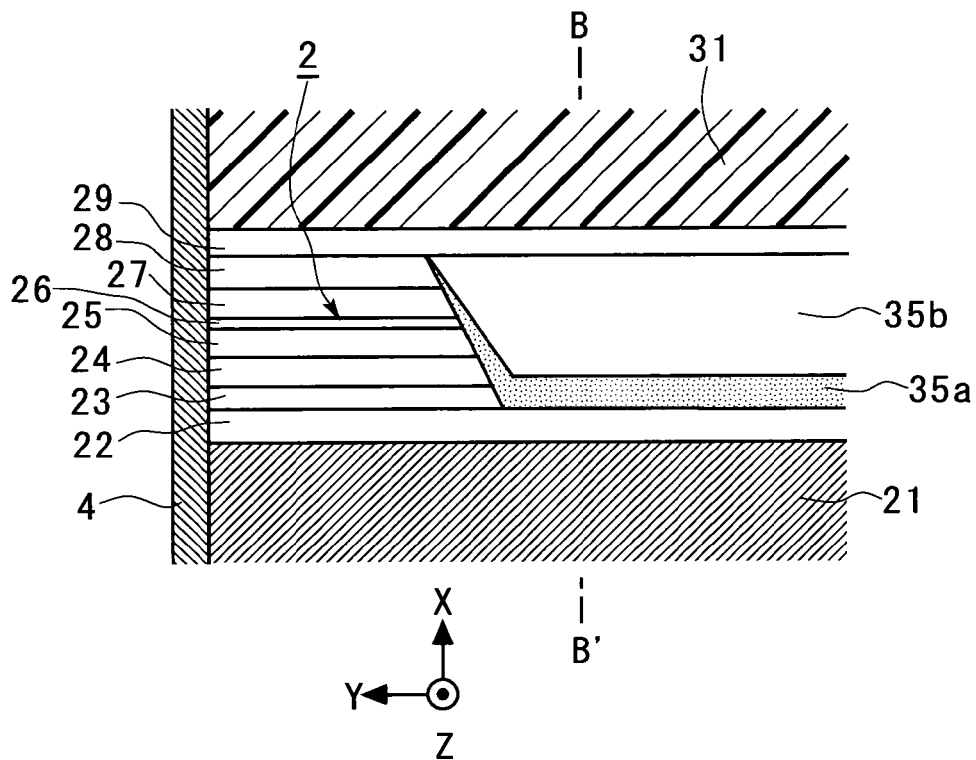
FIG. 4 is a further enlarged view around the TMR device in FIG. 2.
Figure 5:
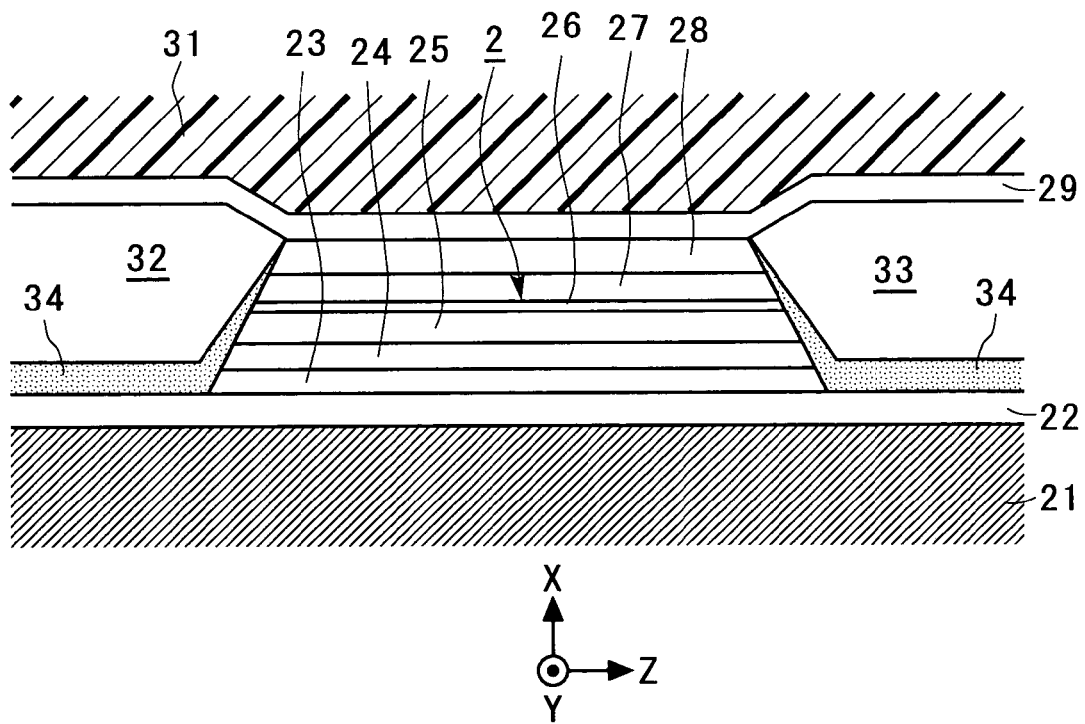
FIG. 5 is a further enlarged view around the TMR device in FIG. 3.

FIG. 1 is a general perspective view schematically illustrating the magnetic head according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A–A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIGS. 1 to 5 (the same applies to figures later described). The Z-axis direction indicated by the arrow is referred to as the "+Z-direction" or "+Z-side," and the opposite direction is referred to as the "−Z-direction" or "−Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head according to the first embodiment comprises a slider 1 as a base; the TMR device 2 as a magneto-resistive device for use as a magnetic head device for reproduction; an inductive magnetic transducing device 3 as a magnetic head device for recording; and a protection film 4 made of a DLC film or the like, and is configured as a composite magnetic head. However, the magnetic head according to the present invention may comprise only the TMR device 2. Also, while the magnetic head of the first embodiment comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In the first embodiment, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 comprises a lower electrode 21 formed on the underlying layer 16; an upper electrode 31 formed overlying the lower electrode 21 (opposite to the base 15); and a lower metal layer (lower layer) 22, a lower metal layer (upper layer) 23, a pin layer 24, a pinned layer 25, a tunnel barrier layer 26, a free layer 27, and an upper metal layer (cap layer) 28 as a non-magnetic metal layer which serves as a protection layer, and an upper metal layer 29 as an underlying layer of the upper electrode 31 laminated in this order from the lower electrode 21 between the electrodes 21, 31. The pin layer 24, pinned layer 25, tunnel barrier layer 26 and free layer 27 constitute a magneto-resistive layer. While the actual TMR device 2 typically has a laminate structure compose of a larger number of layers, rather than the laminate structure composed of the number of layers as illustrated, the illustrated magnetic head represents a laminate structure minimally required for the basic operation of the TMR device 2 for simplifying the description.

In the first embodiment, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is comprised, for example, of a Ta layer or the like. The lower metal layer 23 is an electrically conductive material which is comprised, for example, of an NiFe layer or the like. In the first embodiment, The lower metal layer 23 is formed only coextensively to the magneto-resistive layer, while the lower metal layer 22 widely extends over the electrode 21. Alternatively, the lower metal layer 23 may also be extended widely, or the lower metal layer 22 may be formed only coextensively to the magneto-resistive layer.

The pin layer 24, which is comprised of a antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, CoZrNb, FeCoNi, or the like. The pinned layer 25 has its magnetization direction fixed in a predetermined direction by an exchange bias magnetic field between the pinned layer 25 and the pin layer 24. On the other hand, the free layer 27 freely varies its magnetization direction in response to an external magnetic field which is basically magnetic information. In the first embodiment, the pin layer 24, pinned layer 25, tunnel barrier layer 26 and free layer 27 are laminated in this order from the lower electrode 21. Alternatively, the free layer 27, tunnel barrier layer 26, pinned layer 25 and pin layer 24 may be laminated in this order from the lower electrode 21. The tunnel barrier layer 26 is formed, for example, of a material such as $Al_2O_3$, NiO, GdO, MgO, $Ta_2O_5$, $MoO_2$, $TiO_2$, $WO_2$, or the like.

The upper metal layer (non-magnetic metal layer) 28, serving as a cap layer, is formed of a monolayer film or a multilayer film made of simple Ta, Rh, Ru, Os, W, Pd, Pt, or Au, or an alloy made up of two or more of these elements in combination. The thickness of the upper metal layer 28 preferably is chosen to be 7 nm or more. The upper metal layer 28 having the thickness of 7 nm or more can reduce more a damage to the magneto-resistive layer when an oxide film on the surface of the upper metal layer 28 is removed by dry etching in a manufacturing process. In the first embodiment, the upper metal layer 28 is milled together with the layers 23–27 during the manufacturing, as described above, so that the upper metal layer 28 substantially exactly overlaps with the layers 23–27.

The upper metal layer 29, serving as the underlying layer of the upper electrode 31, is made of an electrically conductive material formed of a non-magnetic metal such as Ta or the like. In the first embodiment, the upper metal layer 29 is provided for holding a magnetic shield gap (a gap between the electrodes 21, 31) of a desired dimension. However, the upper metal layer 29 may not be provided.

As illustrated in FIGS. 3 and 5, hard magnetic layers 32, 33 are formed on both sides of the free layer 27 and pin layer 24 in the Z-axis direction as magnetic domain control layers for applying a biasing magnetic field to the free layer 27 for magnetic domain control. The hard magnetic layers 32, 33 are formed, for example, of a material such as Cr/CoPt (cobalt platinum alloy), Cr/CoCrPt (cobalt chromium platinum alloy), TiW/CoPt, TiW/CoCrPt, or the like. An insulating layer 34 made of $Al_2O_3$ or the like is formed under these hard magnetic layers 32, 33. The insulating layer 34 also intervenes between end faces of the hard magnetic layers 32, 33 and layers 23–28, such that the layers 23–28 are not electrically short-circuited by the hard magnetic layers 32, 33.

As illustrated in FIGS. 2 and 4, an insulating layer 35a made of $Al_2O_3$ or the like and a layer (hereinafter referred to as the "damage reducing layer") 35b made of a material including at least one element having a larger atomic weight than Si (hereinafter referred to as the "damage reducing material") are formed between the lower metal layer 22 and upper metal layer 29 in a region in which the hard magnetic layers 32, 33 are not formed. In the first embodiment, the layers 35a, 35b constitute a composite-layer film formed to be in contact with an effective region effectively involved in detection of magnetism in the magneto-resistive layer (in the first embodiment, a region in which a current flows substantially in a direction perpendicular to film surfaces of the magneto-resistive layer) without overlapping with the effective region.

As mentioned above, since the hard magnetic layers 32, 33 are formed on both sides of the layers 23–28 in the Z-axis direction, the insulating layer 35a and damage reducing layer 35b are located on the side (−Y-side) opposite to the ABS side of the layers 23–28, as illustrated in FIG. 4. In the first embodiment, the −Y-side end faces of the layers 23–28 are formed by collective milling during the manufacturing, as described later, to form a single tapered face. As illustrated in FIG. 4, the insulating layer 35a is formed along the end face on the −Y-side of the layers 23–28 and the top face of the lower metal layer 22 in a relatively small thickness. The damage reducing layer 35b is formed on the insulating layer 35a which intervenes between the +Y-side end face of the damage reducing layer 35b and the −Y-side end faces of the layers 23–28, and between the bottom face of the damage reducing layer 35b and the to top face of the lower metal layer 22. In this way, the layers 23–28 are not short-circuited by the damage reducing layer 35b even if the damage reducing material is a conductor or a semiconductor.

In the present invention, an insulating material may be used for the damage reducing material, in which case the insulating layer 35a need not be formed, and the damage reducing layer 35b may be formed to extend over a region in which the insulating layer 35a would be formed. In this event, the damage reducing layer 35b constitutes a single-layer film (or may constitute a multi-layer film, as a matter of course) formed to be in contact with an effective region effectively involved in detection of magnetism in the magneto-resistive layer without overlapping with the effective region.

In the first embodiment, since the damage reducing layer 35b and insulating layer 35a are formed in the foregoing manner, the damage reducing layer 35b (and therefore, the damage reducing material) intervenes between the whole region of the −Y-side end face of the tunnel barrier layer 26, and the vicinity of the mapped region of the −Y-side end face of the tunnel barrier layer 26 mapped in both of the thickness direction (X-axis direction) of the magneto-resistive layer and a direction inclined to the thickness direction to the whole region of the −Y-side end face of the tunnel barrier layer 26, for a surface having a height (position in the X-axis direction) substantially identical to the top face (+X-side (opposite to the base 15) surface) of the upper metal layer (non-magnetic metal layer) 28 and offset from the upper metal layer 28, as can be seen also in FIG. 4. A portion of the damage reducing layer 35b disposed in the remaining region does not reduce an ion beam damage of a path accessing to the −Y-side end face of the tunnel barrier layer 26, as described later, but simply serves as a spacer between the lower metal layer 22 and upper metal layer 29. Therefore, the damage reducing layer 35b may not be formed, for example, in the right side of line B–B' in FIG. 4, but a layer of an arbitrary material (for example, the same material as the insulating layer 35a) may be formed instead. However, in the first embodiment, the damage reducing layer 35b is intervened on the −Y-side of the B–B' line in FIG. 4 because the damage reducing layer 35b existing on the −Y-side of the B–B' line in FIG. 4 does not cause any inconvenience, and the damage reducing layer 35b disposed only in the region mentioned above would require more efforts and time when manufacturing.

The damage reducing material may be, for example, simple P, Ti, V, Cr, Mn, Fe, Co, Ni, Cu, Zn, Ga, Ge, As, Zr, Nb, Mo, Tc, Ru, Rh, Pt, Ag, Cd, In, Sn, Sb, Hf, Ta, W, Re, Os, Ir, Au, Hg, Tl, Pb, Bi, or a non-magnetic metal or a non-magnetic semiconductor including any one or more of them. Alternatively, the damage reducing material may be an insulating material such as $TiO_2$, MgO, $Ta_2O_5$, $WO_3$ or the like. Preferably, the damage reducing material is a simple Zr, Nb, Mo, Tc, Ru, Rh, Pt, Ag, Hf, Ta, W, Re, Os, Ir, Au, or an alloy including any of these elements. Further preferably, the damage reducing material is simple Hf, Ta, W, Re, Os, Ir, Pt, Au, or an alloy including any of these elements.

The damage reducing layer 35b is formed separately from the hard magnetic layers 32, 33, and does not constitute a magnetic domain control layer for applying a biasing magnetic field to the free layer 27. Since the hard magnetic layers 32, 33 are made of material such as Cr/CoPt or the like as mentioned above, and so made of the damage reducing material, the hard magnetic layers 32, 33 can also be said to be damage reducing layers, as a consequence. In the present invention, even if the magnetic domain control layer serves as a damage reducing layer as a result, as is the case with the damage reducing layer 35b, the damage reducing material is disposed in regions as mentioned above other than the magnetic domain control layer.

As illustrated in FIGS. 2 and 3, the inductive magnetic transducing device 3 has the upper electrode 31 which is additionally used as a lower magnetic layer for the device 3; an upper magnetic layer 36; a coil layer 37; a write gap layer 38 made of alumina or the like; an insulating layer 39 made of an organic resin such as a novolac resin, a protection layer 40 made of alumina or the like, and the like. NiFe, FeN or the like, for example, is used as a material for the magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure.

Next, description will be made on an exemplary method of manufacturing a magnetic head according to the first embodiment.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 6A:
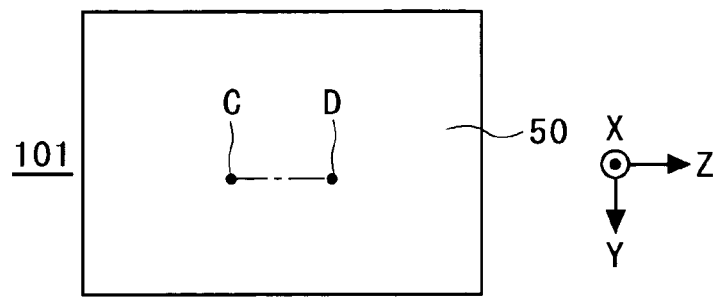
FIGS. 6A and 6B are diagrams schematically illustrating a step which makes up a wafer process in a method of manufacturing the magnetic head illustrated in FIGS. 1 to 5.
Figure 6B:
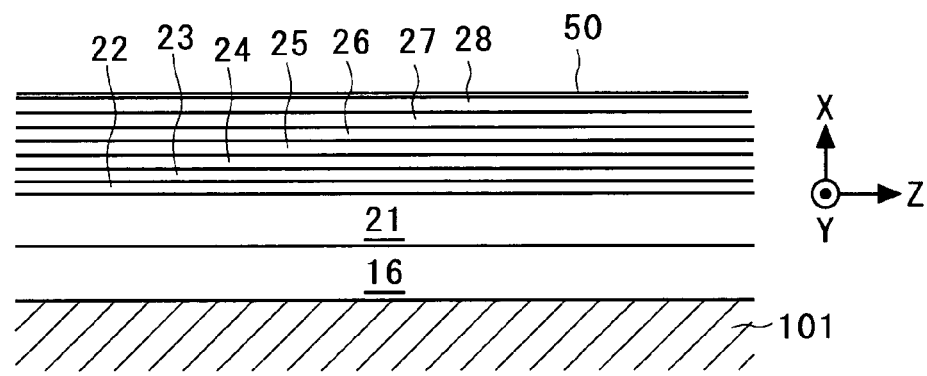
Figure 7A:
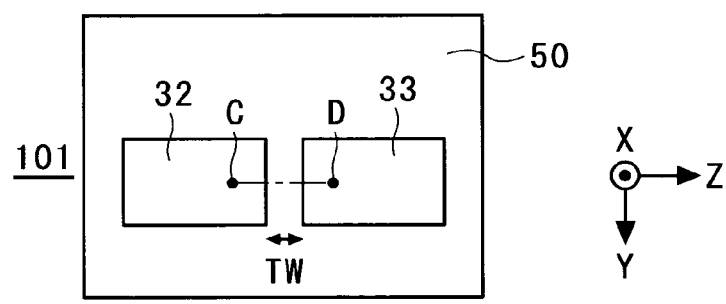
FIGS. 7A and 7B are diagrams schematically illustrating a further step which makes up the wafer process in the method of manufacturing the magnetic head illustrated in FIGS. 1 to 5.
Figure 7B:
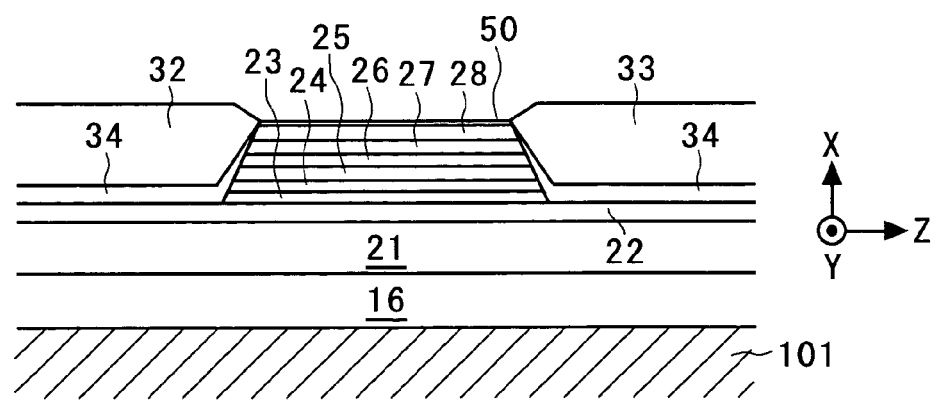
Figure 8A:
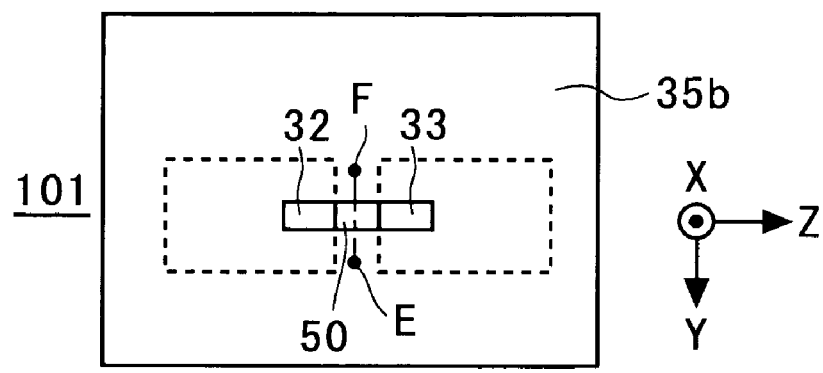
FIGS. 8A and 8B are diagrams schematically illustrating a further step which makes up the wafer process in the method of manufacturing the magnetic head illustrated in FIGS. 1 to 5.
Figure 8B:
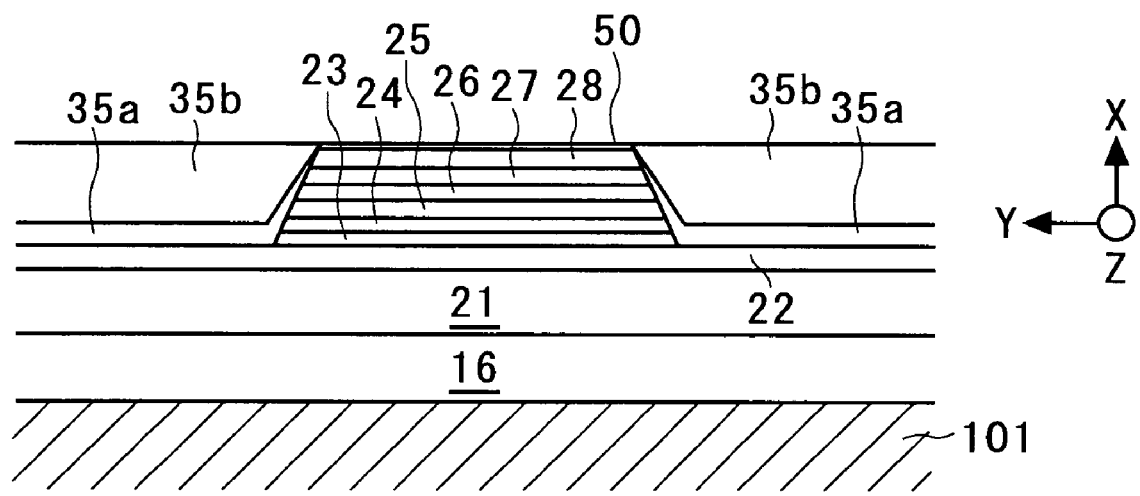

The outline of the wafer process will be described with reference to FIGS. 6 to 10. FIGS. 6 to 10 are diagrams schematically illustrating respective steps which make up the wafer process, wherein FIGS. 6A, 7A, 8A, and 10A are general plan views, respectively; FIG. 6B is a general cross-sectional view taken along a line C–D in FIG. 6A; FIG. 7B is a general cross-sectional view taken along a line C–D in FIG. 7A; FIG. 8B is a general cross-sectional view taken along a line E–F in FIG. 8A; FIG. 9 is a general cross-sectional view corresponding to FIG. 8B; and FIG. 10B is a general cross-sectional view taken along a line E–F in FIG. 10A. In FIG. 7A, TW indicates the width of a track defined by the TMR device 2.

First, in the wafer process, the underlying layer 16, lower electrode 21, lower metal layer 22, lower metal layer 23, pin layer 24, pinned layer 25, tunnel barrier layer 26, free layer 27, and upper metal layer 28 are sequentially laminated on the wafer 101. In this event, the lower electrode 21 is formed, for example, by a plating method, while the other layers are formed, for example, by a sputtering method. The upper metal layer 28 is formed in a predetermined thickness such that the thickness of the upper metal layer 28 remains 7 nm or more after dry etching for removing the surface oxide film described later. Subsequently, the substrate in this state is once left in the atmosphere. In this event, the top face of the magneto-resistive layer (top face of the free layer 27 in the first embodiment) is protected by the upper metal layer 28, so that it is not oxidized. However, an oxide film 50 is formed on the top face of the upper metal layer 28 (FIGS. 6A and 6B).

Next, the lower metal layer 23, the pin layer 24, pinned layer 25, tunnel barrier layer 26, free layer 27, upper metal layer 28 and oxide film 50 are partially removed by first ion milling. Next, the insulating layer 34 and hard magnetic layers 32, 33 are formed in the removed portions by a lift-off method (FIGS. 7A and 7B).

Next, the lower metal layer. 23, pin layer 24, pinned layer 25, tunnel barrier layer 26, free layer 27, upper metal layer 28, oxide film 50, hard magnetic layers 32, 33, and insulating layer 34 are partially removed while leaving a strip portion which has a necessary width (width in the Y-axis direction) with respect to the height direction of the TMR device 2, and extends in the Z-axis direction by a predetermined distance. Next, the insulating layer 35a and damage reducing layer 35b are formed in the removed portions by a lift-off method (FIGS. 8A and 8B).

Next, the oxide film 50 formed on the top face of the upper metal layer 28 is removed by dry etching such as sputter etching, ion beam etching or the like in the same vacuum chamber in which the upper metal layer 29 is formed (FIG. 9). In this event, since the upper metal layer 28 is formed in a relatively large thickness of 7 nm or more, the upper metal layer 28 reduces a damage to the tunnel barrier layer 26 by an ion beam which is passing along a path 1 that passes through the upper metal layer 28, as illustrated in FIG. 9. On the other hand, as illustrated in FIG. 9, the damage reducing layer 35b intervening in a path 2 reduces a damage to the tunnel barrier layer 26 by an ion beam which does not pass the upper metal layer 28 but is directing to the –Y-side end face of the tunnel barrier layer 26 through the path 2. While in FIG. 9, the ion beam is shown to travel only in the X-axis direction, the ion beam actually has a component which is obliquely incident with respect to the X-axis direction.

Figure 10A:
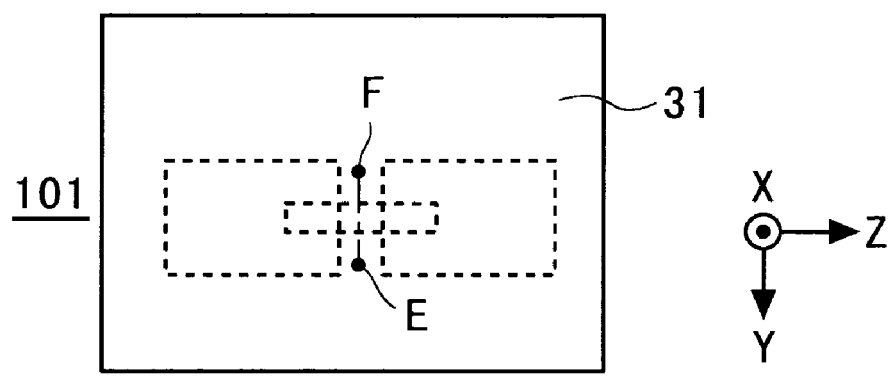
FIGS. 10A and 10B are diagrams schematically illustrating a further step which makes up the wafer process in the method of manufacturing the magnetic head illustrated in FIGS. 1 to 5.
Figure 10B:
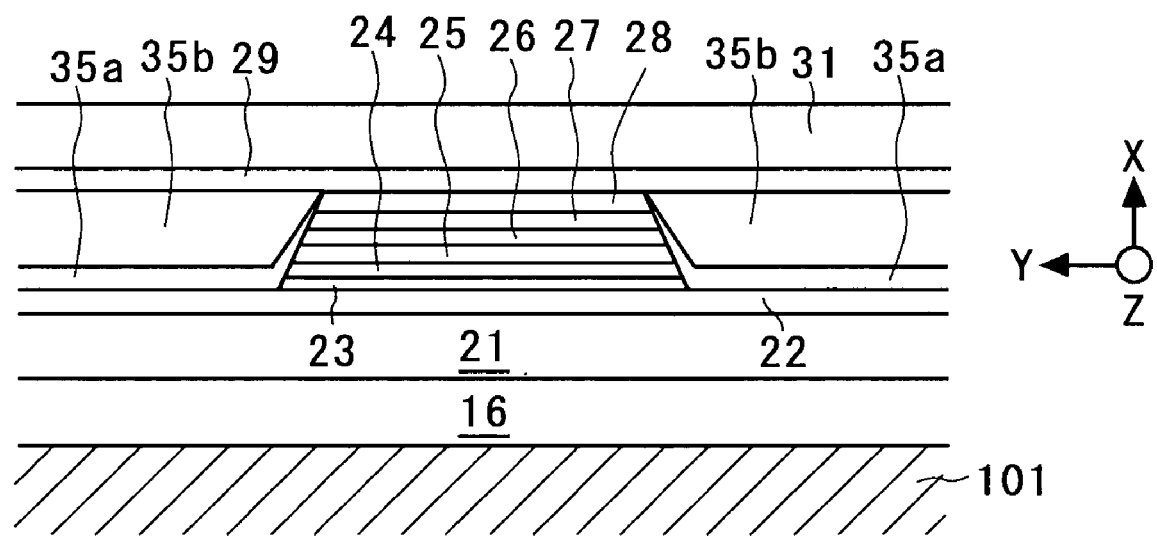

Subsequently, the upper metal layer 29 is formed by a sputtering method or the like, and the upper electrode 31 is formed by a plating method or the like (FIGS. 10A and 10B).

Finally, the gap layer 38, coil layer 37, insulating layer 39, upper magnetic layer 36, and protection layer 40 are formed, and the electrodes 5a–5d are formed. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, the protection film 4 is formed on the surface of the ABS side, and the rails 11, 12 are formed by etching or the like. Finally, the bar is cut by machining into individual magnetic heads. In this manner, the magnetic heads are completed in accordance with the first embodiment.

According to the first embodiment, since the upper metal layer 28 is formed on the top surface of the free layer 27 as described above, the upper metal layer 28 prevents the surface of the free layer 27 from oxidization. In addition, even if the surface of the upper metal layer 28 is oxidized in the air, the surface oxide film 50 on the upper metal layer 28 is removed by dry etching before the upper electrode 29 is formed, so that a good electric contact can be established between the upper electrode 31 and upper metal layer 28. In this event, the magneto-resistive layer is damaged by an ion beam in the dry etching. However, in the first embodiment, since the upper metal layer 28 has the thickness of 7 nm or more which is relatively thick, the magneto-resistive layer (particularly, the tunnel barrier layer 26) is less damaged by the ion beam along the path 1 in FIG. 9.

In addition, since the damage reducing layer 35b is interposed in the path 2 in FIG. 9 in the first embodiment, the tunnel barrier layer 26 is less damaged by the ion beam directing to the –Y-side end face of the tunnel barrier layer 26 along the path 2, as compared with the prior art device which includes only $Al_2O_3$ or $SiO_2$ in the path 2 (a comparative example corresponding to this will be described later).

Thus, the device according to the first embodiment exhibits better characteristics such as the MR ratio as compared with the prior art.

Now, a magnetic head of a comparative example for comparison with the magnetic head according to the first embodiment will be described with reference to FIGS. 11 and 12.

Figure 11:
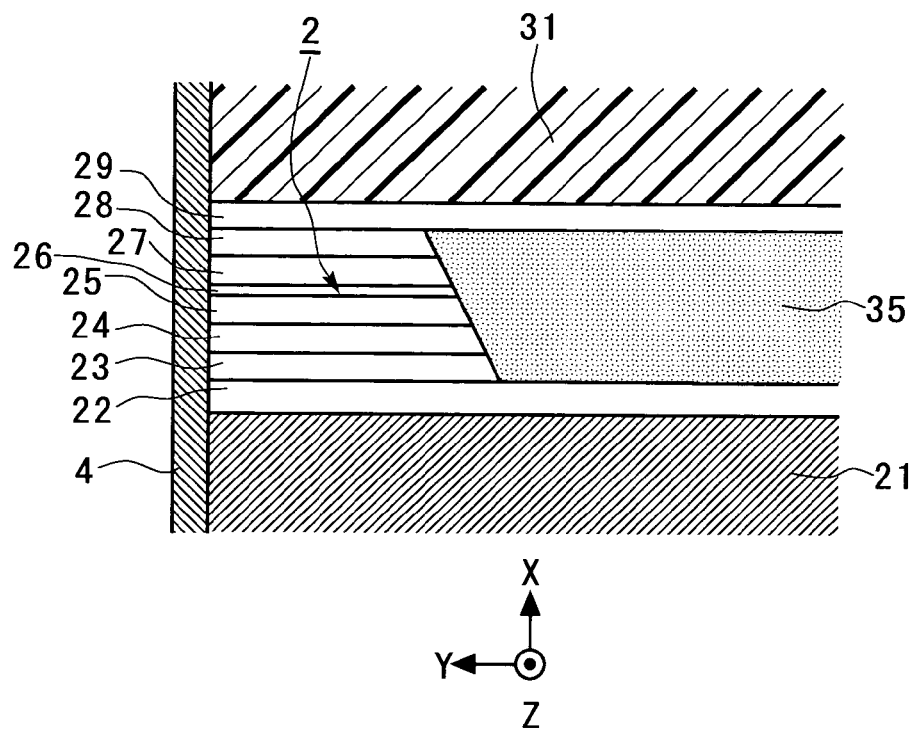
FIG. 11 is a cross-sectional view generally illustrating a main portion of a magnetic head according to a comparative example.
Figure 12:
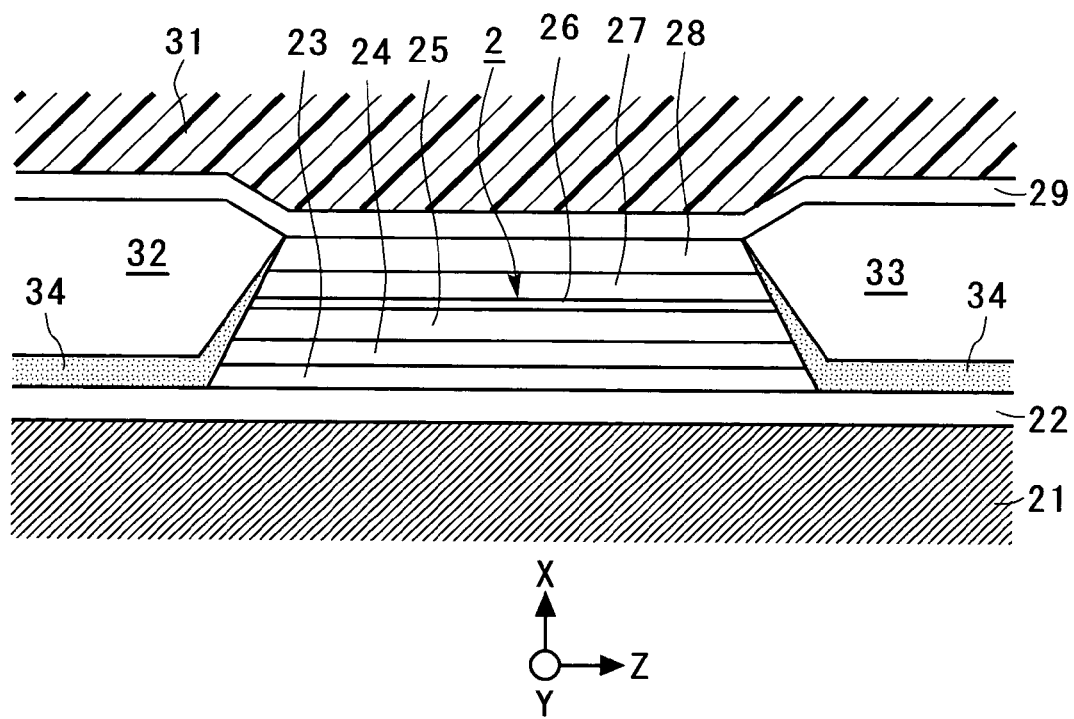
FIG. 12 is another cross-sectional view generally illustrating the main portion of the magnetic head according to the comparative example illustrated in FIG. 11.

FIG. 11 is a cross-sectional view generally illustrating a main portion of the magnetic head in the comparative example. FIG. 12 is another cross-sectional view generally illustrating the main portion of the magnetic head in the comparative example. FIGS. 11 and 12 correspond to FIGS. 4 and 5, respectively. In FIGS. 11 and 12, components identical to or corresponding to those in FIGS. 4 and 5 are designated by the same reference numerals, and repeated description will be omitted.

The magnetic head in the comparative example differs from the magnetic head according to the first embodiment only in that an insulating layer 35 made of $Al_2O_3$ or $SiO_2$ is formed instead of the insulating layer 35a and damage reducing layer 35b in the first embodiment.

Figure 15A:
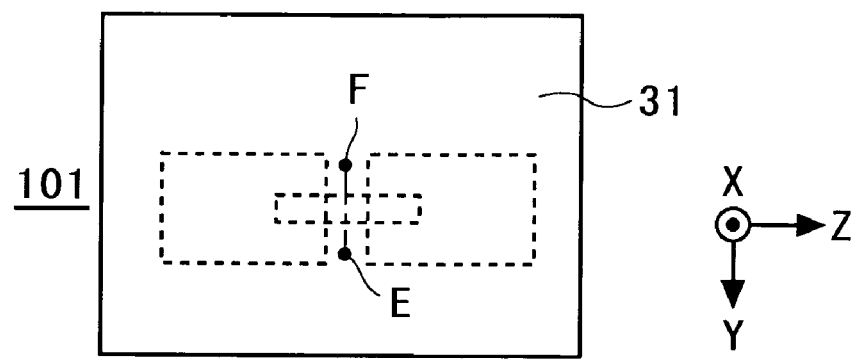
FIGS. 15A and 15B are diagrams schematically illustrating a further step which makes up the wafer process in the method of manufacturing the magnetic head illustrated in FIGS. 11 and 12.
Figure 15B:
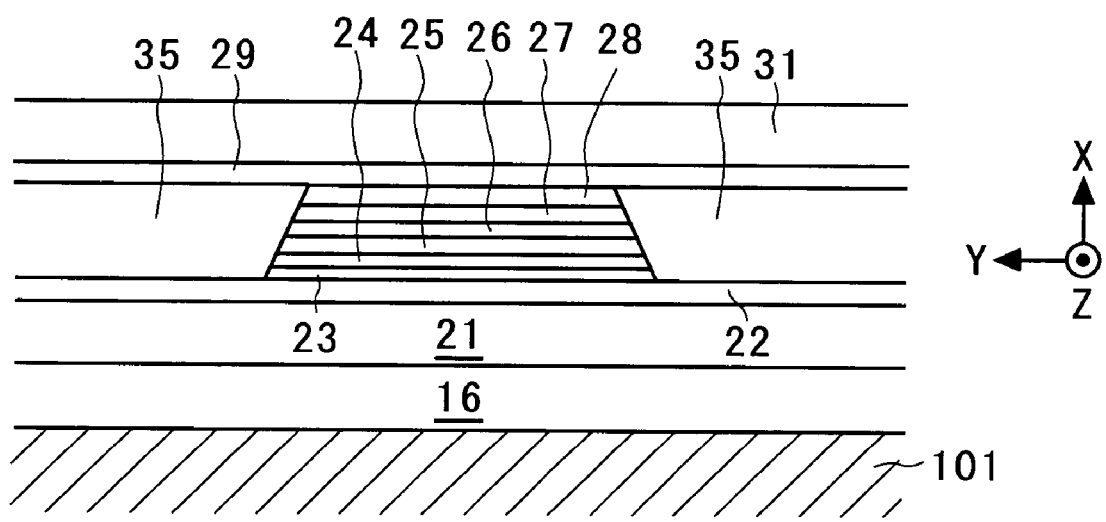

A method of manufacturing the magnetic head in the comparative example will be described with reference to FIGS. 13 to 15. FIGS. 13 to 15 correspond to FIGS. 8 to 10, respectively.

This manufacturing method in the comparative example differs from the method of manufacturing the magnetic head according to the first embodiment only in the wafer process which will be described below.

Figure 13A:
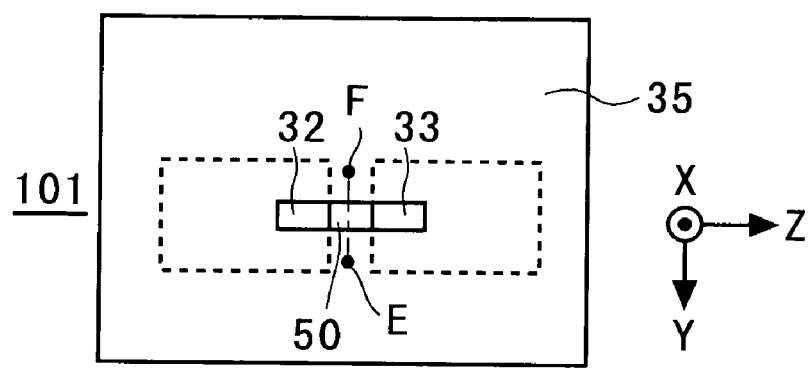
FIGS. 13A and 13B are diagrams schematically illustrating a step which makes up a wafer process in a method of manufacturing the magnetic head illustrated in FIGS. 11 and 12.
Figure 13B:
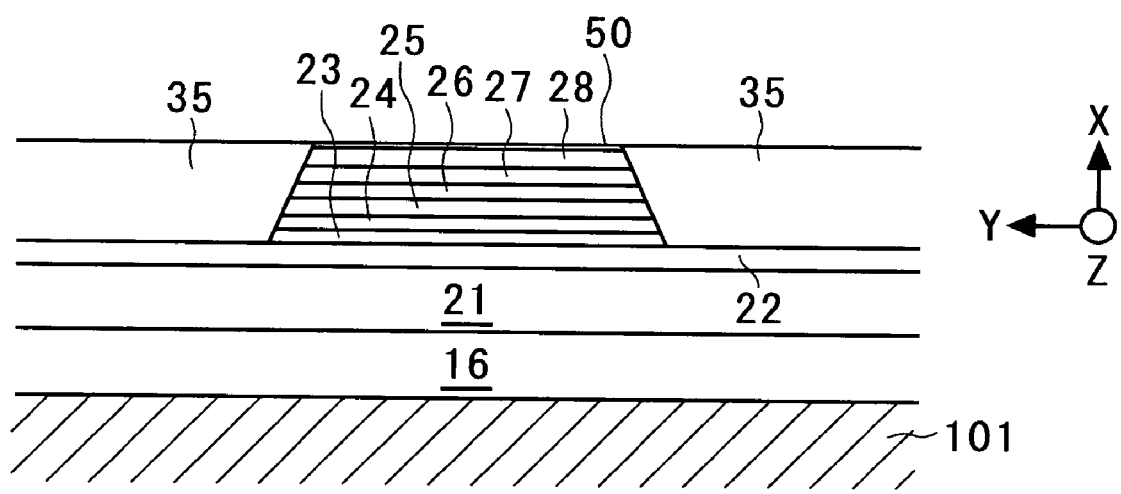

The wafer process passes through the steps illustrated in FIGS. 6 and 7 described above. Subsequently, the lower metal layer 23, pin layer 24, pinned layer 25, tunnel barrier layer 26, free layer 27, upper metal layer 28, oxide film 50, hard magnetic layers 32, 33, and insulating layer 34 are removed by second ion milling except for a strip portion which has a necessary width (width in the Y-axis direction) with respect to the height direction of the TMR device 2 and extends in the Z-axis direction by a predetermined length. Though similar to the aforementioned method of manufacturing the magnetic head according to the first embodiment up to this stage, an insulating film 35 made of $Al_2O_3$ or $SiO_2$ is formed in the removed portions by a lift-off method when manufacturing the magnetic head in the comparative example (FIGS. 13A and 13B). The subsequent steps are similar to those in the method of manufacturing the magnetic head according to the first embodiment.

Next, an oxide film 50 formed on the top face of the upper metal layer 28 is removed by dry etching such as sputter etching, ion beam etching or the like in the same vacuum chamber in which the upper metal layer 29 is formed (FIG. 14). In this event, though identical to the aforementioned case shown in FIG. 9 in terms of the path 1, the path 2 in the comparative example includes only $Al_2O_3$ or $SiO_2$, so that the tunnel barrier layer 26 will be more gravely damaged, as compared with the structure illustrated in FIG. 9, by an ion beam which is directing to the −Y-side end face of the tunnel barrier layer 26 along the path 2 without passing through the upper metal layer 28.

Subsequently, the upper metal layer 29 is formed by a sputter method or the like, and the upper electrode 31 is further formed by a plating method (FIGS. 15A and 15B), followed by completion of the wafer process.

This comparative example corresponds to the prior art. As is apparent from a comparison of the path 2 shown in FIG. 9 with the path 2 shown in FIG. 14, in the first embodiment which has the damage reducing layer 35b interposed in the path 2, the tunnel barrier layer 26 is less damaged by the ion beam as compared with the comparative example in which $Al_2O_3$ or $SiO_2$ alone exists in the path 2.

Next, a magnetic head according to a second embodiment of the present invention will be described with reference to FIGS. 16 to 20.

Figure 16:
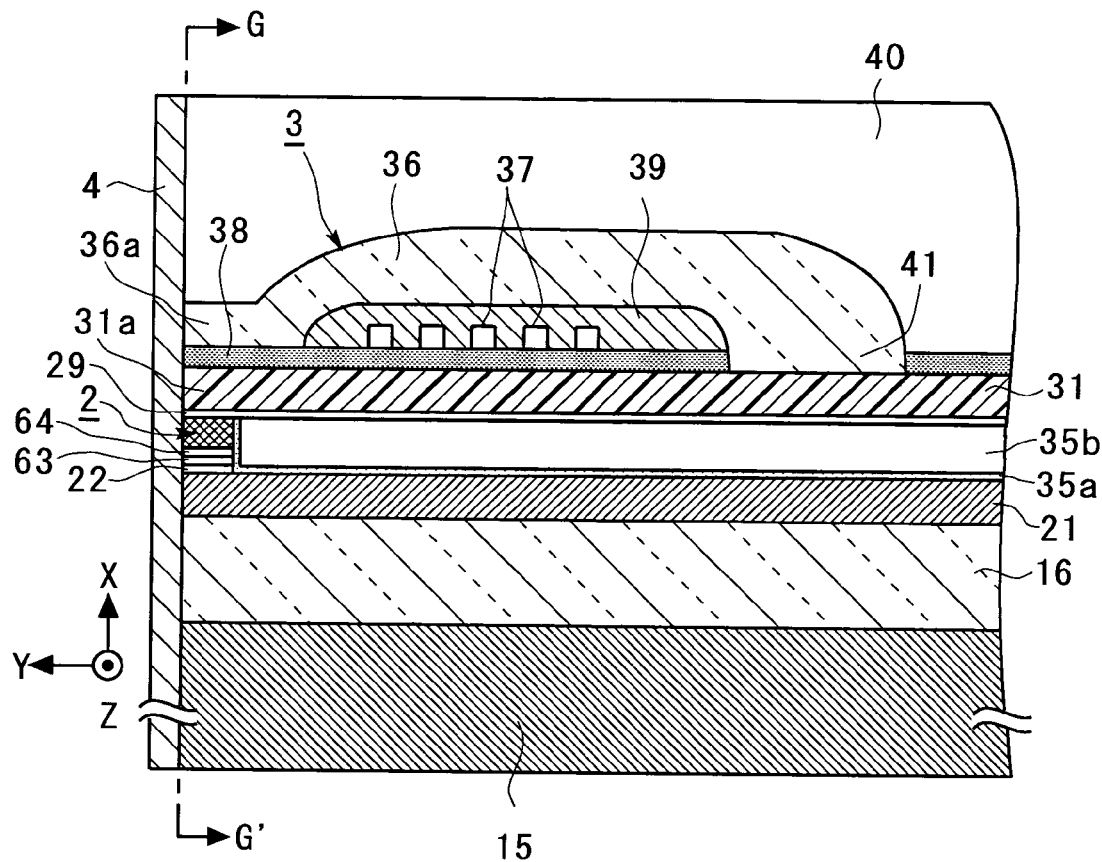
FIG. 16 is an enlarged cross-sectional view schematically illustrating a portion of a TMR device and an inductive magnetic transducing device in a magnetic head according to a second embodiment.
Figure 17:
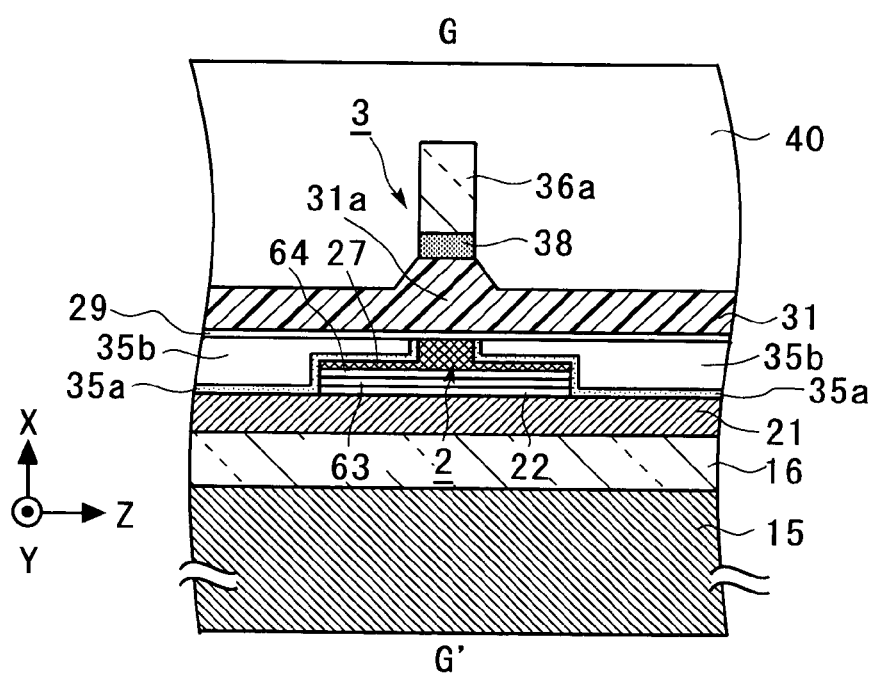
FIG. 17 is a general sectional view taken along a line G–G' indicated by arrows in FIG. 16.
Figure 18:
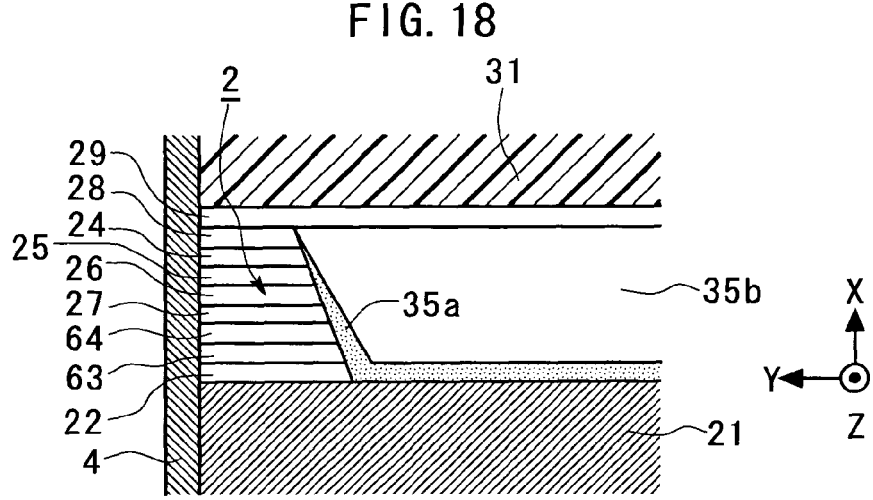
FIG. 18 is a further enlarged view around the TMR device in FIG. 16.
Figure 19:
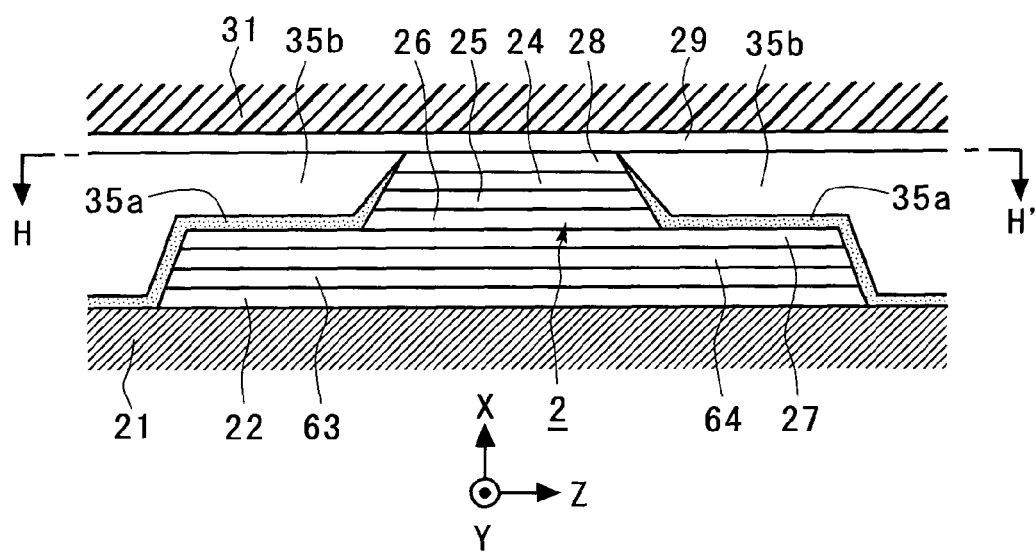
FIG. 19 is a further enlarged view around the TMR device in FIG. 17.
Figure 20:
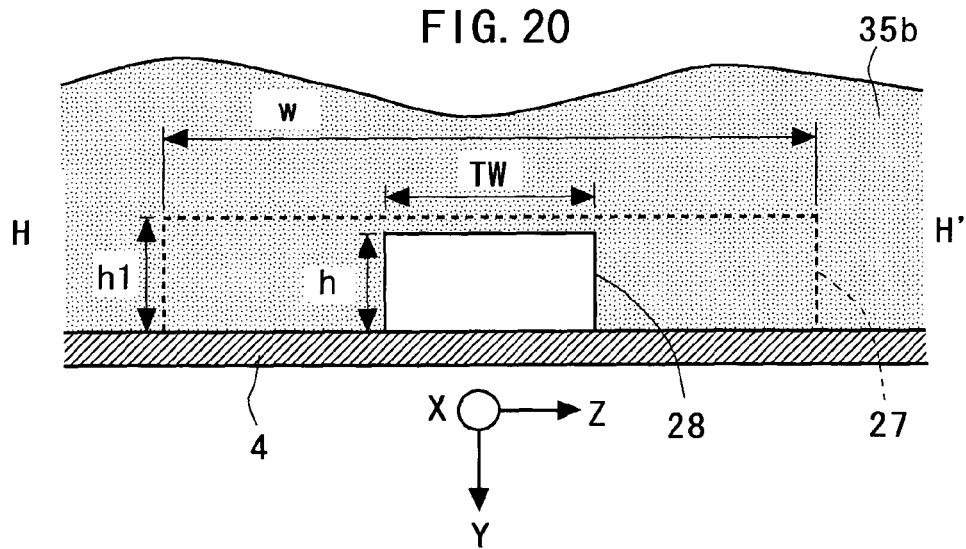
FIG. 20 is a general sectional view taken along a line H–H' indicated by arrows in FIG. 19.

FIG. 16 is an enlarged cross-sectional view schematically illustrating a portion of a TMR device 2 and an inductive magnetic transducing device 3 in a magnetic head according to a second embodiment of the present invention. FIG. 17 is a general sectional view taken along a line G–G' indicated by arrows in FIG. 16. FIG. 18 is a further enlarged view illustrating around the TMR device 2 in FIG. 16. FIG. 19 is a further enlarged view illustrating around the TMR device 2 in FIG. 17. FIG. 20 is a cross-sectional view taken along a line H–H' in FIG. 19. FIGS. 16 to 19 correspond to FIGS. 2 to 5, respectively.

In FIGS. 16 to 20, components identical or corresponding to those in FIGS. 1 to 5 are designated by the same reference numerals, and repeated description thereon is omitted. The magnetic head according to the second embodiment differs from the magnetic head according to the first embodiment only in the aspects described below.

In the second embodiment, the lower metal layers 22, 23 are replaced by a lower metal layer 22 which is a laminate of these two layers. The lower metal layer 22 is formed only in a region substantially exactly overlapping with a free layer 27, an antiferromagnetic layer 63, and a non-magnetic metal layer 64.

In the second embodiment, as illustrated in FIGS. 18 and 19, a TMR device 2 comprises a lower electrode 21 formed on the underlying layer 16; an upper electrode 31 formed overlying the lower electrode 21 (opposite to a base 15); and the lower metal layer 22, the antiferromagnetic layer 63, the non-magnetic metal layer 64, a free layer 27, a tunnel barrier layer 26, a pinned layer 25, a pin layer 24, an upper metal layer (cap layer) 28 as a non-magnetic metal layer which serves as a protection layer, and an upper metal layer 29 as an underlying layer of the upper electrode 31 laminated in this order from the lower electrode 21 between the electrodes 21, 31. The free layer 27, tunnel barrier layer 26, pinned layer 25 and pin layer 24 constitute a magnetoresistive layer. While the actual TMR device 2 typically has a laminate structure compose of a larger number of layers, rather than the laminate structure composed of the number of layers as illustrated, the illustrated magnetic head represents a laminate structure minimally required for the basic operation of the TMR device 2 for simplifying the description.

The antiferromagnetic layer 63 applies an exchange bias magnetic field as a biasing magnetic field to the free layer 27 in the Z-axis direction (track width direction), without fixing the magnetization direction of the free layer 27, through exchange bias with the free layer 27 by way of the non-magnetic metal layer 64. In other words, the antiferromagnetic layer 63 and non-magnetic metal layer 64 serve as a magnetic domain control layer for applying the biasing magnetic field to the free layer 27. The antiferromagnetic layer 63 is formed, for example, of an Mn-based alloy such as PtMn, IrMn, RuRhMn, FeMn, NiMn, PdPtMn, RhMn, CrMnPt, or the like. The non-magnetic metal layer 64 is formed, for example, of Cu, Ru, Rh, Cr, Au, Ag or the like. Since the non-magnetic metal layer 64 having a larger thickness results in weaker exchange bias, the thickness of the non-magnetic metal layer 64 is set so that a sufficient biasing magnetic field is applied to the free layer 27. In some cases, the non-magnetic metal layer 64 may be omitted. The pinned layer 25 has its magnetization direction fixed in the Y-axis direction by an exchange bias magnetic field between the pinned layer 25 and the pin layer 24. On the other hand, the free layer 27 freely varies its magnetization direction in response to an external magnetic field which is basically magnetic information although the biasing magnetic field is applied to the free layer 27 as described above.

As illustrated in FIGS. 18 to 20, the dimensions of the tunnel barrier layer 26, pinned layer 25, pin layer 24 and upper metal layer 28 on plan view, when seen from the X-axis direction, are defined by a desired track width TW and MR height h in the second embodiment. Strictly speaking, the dimensions of the layers 24–26, 28 on plan view are determined by simultaneously ion milling them, as described later. Therefore, these layers have tapered +Z-side, −Z-side and −Y-side end faces as illustrated in FIGS. 18 and 19, and thereby lower ones of the layers 24–26, 28 are slightly larger. However, their dimensions on plan view can be said to be substantially the same. FIG. 20 only illustrates the upper metal layer 28 of the layers 24–26, 28, which has a size of TW×h on plan view. The +Y-side (ABS side) end faces of the layers 24–26, 28 are determined by lapping later described, and are perpendicular to the film surface.

On the other hand, in the second embodiment, the antiferromagnetic layer 63, non-magnetic metal layer 64 and free layer 27 are formed in an area having a size of w×h1, as illustrated in FIG. 20, and are formed in a region substantially exactly overlapping with the region in which the tunnel barrier layer 26, pinned layer 25, pin layer 24 and upper metal layer 28 are formed (the region having a size of w×h) and in a region which continuously extends from that region in the +Z-side and −Z-side. Therefore, w>TW stands. Strictly speaking, the dimensions of the layers 63, 64, 27 are determined by simultaneously milling them, as described below. Therefore, these layers have tapered +Z-side, −Z-side and −Y-side end faces as illustrated in FIGS. 18 and 19, and thereby lower ones of the layers 63, 64, 27 are slightly larger. However, their dimensions on plan view can be said to be substantially the same. FIG. 20 only illustrates the free layer 27 of the layers 63, 64, 27, which has a size of w×h on plan view. Also, the −Y-side end faces of the layers 24–28, 64, 63 are continuously tapered because these layers are simultaneously ion milled, so that the width h1 is wider than the width h, when strictly speaking. However, the widths h1, h can be said to be substantially the same. But, h1>h is assumed in FIG. 6 for facilitating the understanding. Alternatively, the layers 63, 64, 27 may be formed in a region substantially exactly overlapping with the layers 24–26, 28.

As described above, since the antiferromagnetic layer 63 and non-magnetic metal layer 64 constitute the magnetic domain control layer, the magnetic head according to the second embodiment eliminates the hard magnetic layers 32, 33 and insulating layer 34 which are formed in the first embodiment. In the second embodiment, the insulating layer 35a and damage reducing layer 35b are formed not only on the −Y-side (opposite to ABS) of the layers 22, 63, 64, 27, 26, 25, 24, 28 but also on the +Z-side and −Z-side of these layers. In accordance with the prior art, an insulating layer made of $Al_2O_3$ or $SiO_2$ may be formed instead of the insulating layer 35a and damage reducing layer 35b in a portion in which the layers 35a, 35b are formed in the second embodiment.

Next, description will be made on an exemplary method of manufacturing the magnetic head according to the second embodiment.

First, a wafer process is performed. Specifically, a wafer 101 made of $Al_2O_3$—TiC, SiC or the like is provided for making the base 15. Using the thin film forming technology and the like, the aforementioned layers are formed in a large number of magnetic head forming regions in matrix on the wafer 101 to provide the aforementioned structure.

Figure 21A:
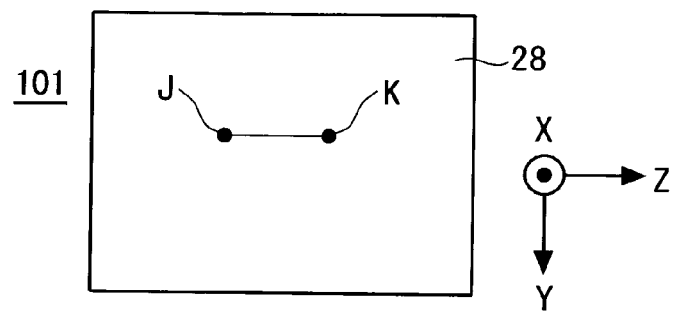
FIGS. 21A and 21B are diagrams schematically illustrating a step which makes up a wafer process in a method of manufacturing the magnetic head illustrated in FIGS. 16 to 20.
Figure 21B:
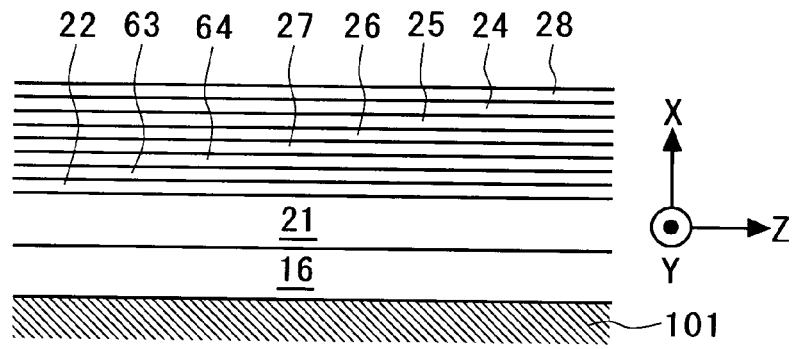
Figure 22A:
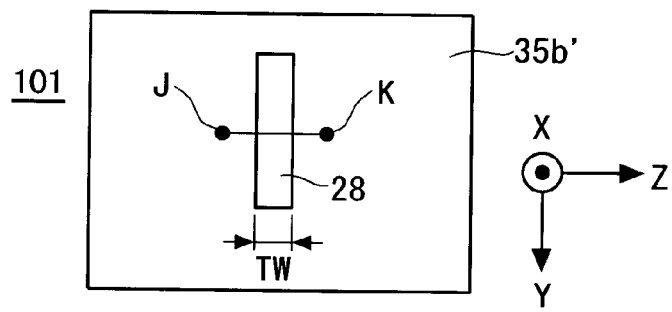
FIGS. 22A and 22B are diagrams schematically illustrating a further step which makes up the wafer process in the method of manufacturing the magnetic head illustrated in FIGS. 16 to 20.
Figure 22B:
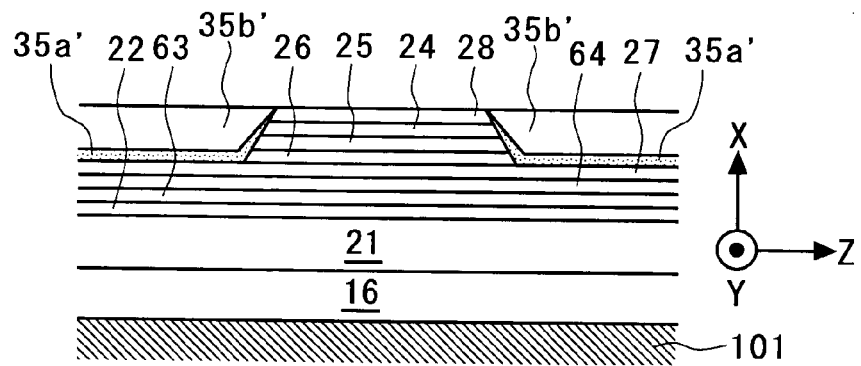
Figure 23A:
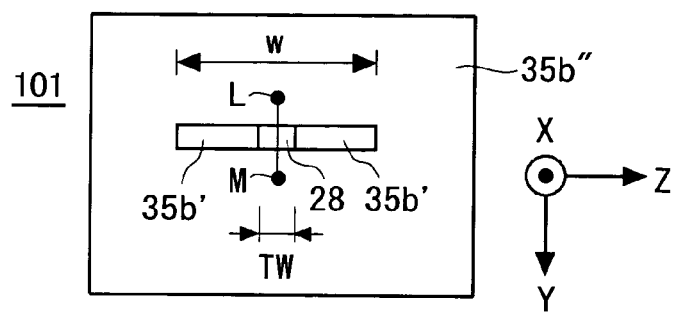
FIGS. 23A and 23B are diagrams schematically illustrating a further step which makes up the wafer process in the method of manufacturing the magnetic head illustrated in FIGS. 16 to 20.
Figure 23B:
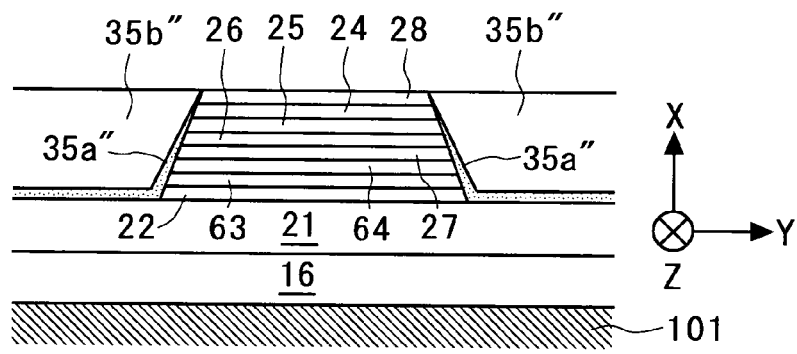
Figure 24A:
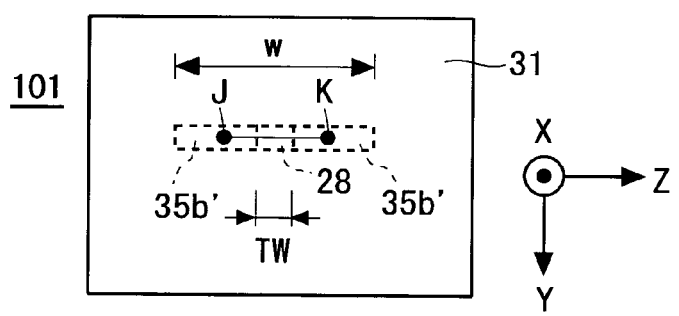
FIGS. 24A and 24B are diagrams schematically illustrating a further step which makes up the wafer process in the method of manufacturing the magnetic head illustrated in FIGS. 16 to 20.
Figure 24B:
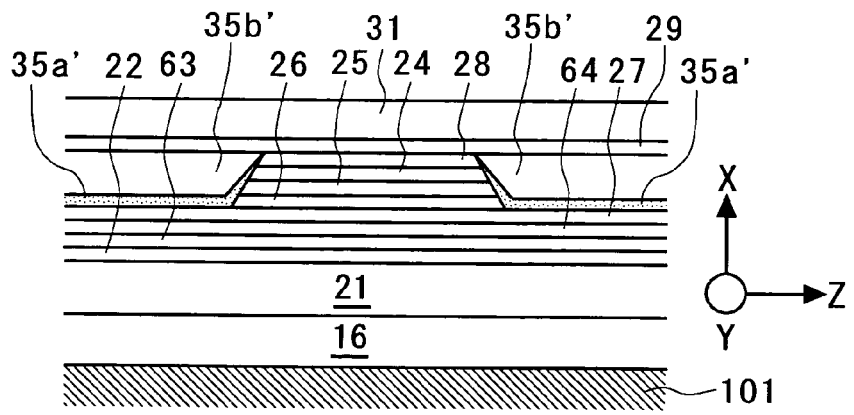

The outline of the wafer process will be described with reference to FIGS. 21 to 24. FIGS. 21 to 24 are diagrams schematically illustrating respective steps which make up the wafer process, wherein FIGS. 21A, 22A, 23A and 24A are general plan views, respectively; FIG. 21B is a general cross-sectional view taken along a line J–K in FIG. 21A; FIG. 22B is a general cross-sectional view taken along a line J–K in FIG. 22A; FIG. 23B is a general cross-sectional view taken along a line L–M in FIG. 23A; and FIG. 24B is a general cross-sectional view taken along a line J–K in FIG. 24A. In FIGS. 22A, 23A and 24A, TW indicates the width of a track defined by the TMR device 2, and w indicates the width of the antiferromagnetic layer 63, non-magnetic metal layer 64 and free layer 27 in the Z-axis direction (track width direction). These correspond to the same reference letters in FIG. 20, respectively. In FIGS. 21 to 23, a surface oxide film corresponding to the surface oxide film 50 in FIGS. 6 to 9 is omitted.

First, in the wafer process, the underlying layer 16, lower electrode 21, lower metal layer 22, antiferromagnetic layer 63, non-magnetic metal layer 64, free layer 27, tunnel barrier layer 26, pinned layer 25, pin layer 24, and upper metal layer 28 are sequentially laminated on the wafer 101 (FIGS. 21A and 21B). In this event, the lower electrode 21 is formed, for example, by a plating method, while the other layers are formed, for example, by a sputtering method. The upper metal layer 28 is formed in a predetermined thickness such that the thickness of the upper metal layer 28 remains 7 nm or more after dry etching for removing the surface oxide film described later. Subsequently, the substrate in this state is once left in the atmosphere. In this event, the top face of the magneto-resistive layer (top surface of the pin layer 24 in the second embodiment) is protected by the upper metal layer 28, so that it is not oxidized. However, an oxide film (not shown) is formed on the top face of the upper metal layer 28 (FIGS. 21A and 21B).

Next, tunnel barrier layer 26, pinned layer 25, pin layer 24, upper metal layer 28 and oxide film are partially removed by first ion milling, except for a strip portion extending in the Z-axis direction by a length in accordance with the track width TW. In this event, the first ion milling is stopped at a position at which the free layer 27 is hardly removed while layers up to the tunnel barrier layer 26 are completely removed. Such a stop position can be appropriately set by monitoring materials produced during the milling, for example, by SIMS (Secondary Ion-microprobe Mass Spectrometer). Then, after the first milling, an insulating layer 35a' which is to be a portion of the insulating layer 35a, and a damage reducing layer 35b' which is to be a portion of the damage reducing layer 35b are formed using a lift-off method in a portion removed by the first ion milling (FIGS. 22A and 22B).

Next, the lower metal layer 22, antiferromagnetic layer 63, non-magnetic metal layer 64, free layer 27, tunnel barrier layer 26, pinned layer 25, pin layer 24, upper metal layer 28, insulating layer 35a' and damage reducing layer 35b' are partially removed while leaving a strip portion which has a necessary width (width in the Y-axis direction) with respect to the height direction of the TMR device 2, and extends in the Z-axis direction by a distance in conformity to the width w. In the second embodiment, the second ion milling is stopped at a position at which the lower electrode 21 is hardly removed while layers up to the lower metal layer 22 is completely removed. Alternatively, the second ion milling may be stopped, for example, at a position at which the lower metal layer 22 is hardly removed while layers up to the antiferromagnetic layer 63 are completely removed. Then, an insulating layer 35a" which is to be the remaining portion of the insulating layer 35a, and a damage reducing layer 35b" which is to be the remaining portion of the damage reducing layer 35b are formed in the portion removed by the second ion milling, using a lift-off method (FIGS. 23A and 23B).

Next, the oxide film (not shown) formed on the top face of the upper metal layer 28 is removed by dry etching such as sputter etching, ion beam etching or the like in the same vacuum chamber in which the upper metal layer 29 is formed. In this event, since the upper metal layer 28 is formed in a relatively large thickness of 7 nm or more, the upper metal layer 28 reduces a damage to the tunnel barrier layer 26 by an ion beam which is passing along a path corresponding to the path 1 in FIG. 9. On the other hand, the damage reducing layer 35b (35b', 35b") intervening in a path corresponding to the path 2 in FIG. 9 reduces a damage to the tunnel barrier layer 26 by ion beam which do not pass the upper metal layer 28 but are directing to the −Y-side, +Z-side, and −Z-side end faces of the tunnel barrier layer 26 through the path corresponding to the path 2 in FIG. 9.

Subsequently, the upper metal layer 29 is formed by a sputtering method or the like, and the upper electrode 31 is formed by a plating method or the like (FIGS. 24A and 24B).

Finally, the gap layer 38, coil layer 37, insulating layer 39, upper magnetic layer 36, and protection layer 40 are formed, and the electrodes 5a–5d are formed. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Then, the ABS surface of the lapped bar is etched as required for removing smear. Next, the protection film 4 is formed on the surface of the ABS side, and the rails 11, 12 are formed by etching or the like. Finally, the bar is cut by machining into individual magnetic heads. In this manner, the magnetic heads are completed in accordance with the second embodiment.

According to the second embodiment, since the damage reducing layer 35b is formed in a similar manner, the second embodiment also provides similar advantages to those of the first embodiment. When the magnetic domain control layer is laminated on the magneto-resistive layer as in the second embodiment, an insulating layer made of $Al_2O_3$ or $SiO_2$ is fully formed near the −Y-side, +Z-side and −Z-side end faces of the tunnel barrier layer 26 as pursuant to the prior art, unlike the abutted structure, the second embodiment provides extremely remarkable benefits.

Now, a magnetic disk apparatus according to a third embodiment of the present invention will be described with reference to FIG. 25.

Figure 25:
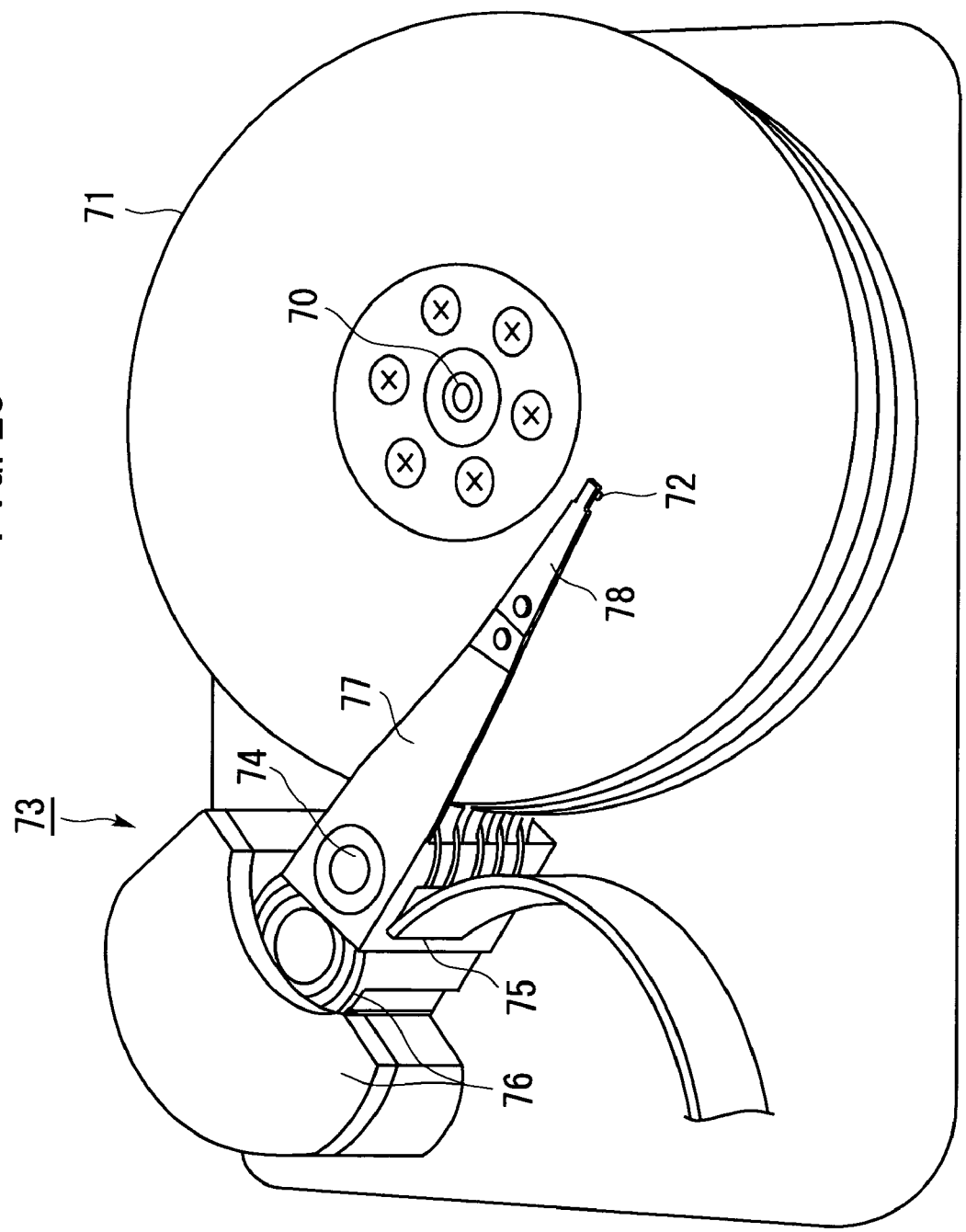
FIG. 25 is a perspective view generally illustrating the configuration of a main portion of a magnetic disk apparatus according to a third embodiment of the present invention.

FIG. 25 is a perspective view generally illustrating the configuration of a main portion of a magnetic disk apparatus according to a third embodiment of the present invention.

The magnetic disk apparatus according to the third embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the third embodiment, the magnetic disk apparatus comprises either of the magnetic heads according to the first and second embodiments described above as the magnetic heads 72. Therefore, according to the third embodiment, the recording density can be increased because the characteristics of the device such as the MR ratio and the like are improved.

A wafer (wafer formed with a large number of TMR devices and inductive magnetic transducing devices) after completion of the wafer process in the manufacturing of magnetic heads having similar structure to the magnetic head according to the first embodiment, and a wafer (wafer formed with a large number of TMR devices and inductive magnetic transducing devices) after completion of the wafer process in the manufacturing of magnetic heads having similar structure to the magnetic head according to the comparative example were fabricated as samples of Example and Comparative Example in the same method and conditions as each other, corresponding to the aforementioned manufacturing method, except that the insulating layer 35a and damage reducing layer 35b are formed in Example, and the insulating layer 35 is formed in Comparative Example. The compositions of main layers in the sample of Example are as shown in Table 1 below, while the compositions of the main layers in the sample of Comparative Example are as shown in Table 2 below. Example is completely the same as Comparative Example only except that the former uses the insulating layer 35a and damage reducing layer 35b, while the latter uses the insulating layer 35. In both Example and Comparative Example, the track width TW was chosen to be 0.13 μm.

TABLE 1

| Name of Layer and Reference Numeral in Drawings | Composition and Thickness of Layer (When composed of two layers or more, a layer more to the left is positioned lower (near the substrate) |
|---|---|
| Upper Electrode 31 (serving also as Upper Magnetic Shield) | NiFe (2 μm) |
| Upper Metal Layer 29 | Ta (3 nm) |
| Damage Reducing Layer 35b | Ta (50 nm) |
| Insulating Layer 35a | $Al_2O_3$ (10 nm) |
| Hard Magnetic Layers 32, 33 | Tiw (10 nm)/CoPt (30 nm)/Ta (50 nm) |
| Insulating Layer 34 | $Al_2O_3$ (10 nm) |
| Upper Metal Layer 28 (cap layer) | Ta (25 nm) |
| Free Layer 27 | CoFe (1 nm)/NiFe (3 nm) |
| Tunnel Barrier Layer 26 | $Al_2O_3$ (0.6 nm) |
| Pinned Layer 25 | CoFe (2 nm)/Ru (0.8 nm)/CoFe (3 nm) |
| Pin layer 24 | PtMn (15 nm) |
| Lower Metal Layer 23 | NiFe (2 nm) |
| Lower Metal Layer 22 | Ta (5 nm) |
| Lower Electrode 21 (serving also as Lower Magnetic Shield) | NiFe (2 μm) |

TABLE 2

| Name of Layer and Reference Numeral in Drawings | Composition and Thickness of Layer (When composed of two layers or more, a layer more to the left is positioned lower (near the substrate)) |
|---|---|
| Upper Electrode 31 (serving also as Upper Magnetic Shield) | NiFe (2 μm) |
| Upper Metal Layer 29 | Ta (3 nm) |
| Insulating Layer 35 | $Al_2O_3$ (60 nm) |
| Hard Magnetic Layers 32, 33 | Tiw (10 nm)/CoPt (30 nm)/Ta (50 nm) |
| Insulating Layer 34 | $Al_2O_3$ (10 nm) |
| Upper Metal Layer 28 (cap layer) | Ta (25 nm) |
| Free Layer 27 | CoFe (1 nm)/NiFe (3 nm) |
| Tunnel Barrier Layer 26 | $Al_2O_3$ (0.6 nm) |
| Pinned Layer 25 | CoFe (2 nm)/Ru (0.8 nm)/CoFe (3 nm) |
| Pin layer 24 | PtMn (15 nm) |
| Lower Metal Layer 23 | NiFe (2 nm) |
| Lower Metal Layer 22 | Ta (5 nm) |
| Lower Electrode 21 (serving also as Lower Magnetic Shield) | NiFe (2 μm) |

During the manufacturing of the samples of Example and Comparative Example, Ar ion beam etching was performed under the following conditions as the dry etching for removing the oxide film on the surface of the upper metal layer 28. An accelerating voltage was set to 250 V; a beam current to 0.1 $mA/cm^2$; an Ar gas pressure to $2\times10^{-4}$ Torr; a substrate temperature to 30° C.; and an etching time to approximately 2 minutes.

The resistance and MR ratio of all TMR devices formed in the wafers were measured for the respective samples of Example and Comparative Example. Table 3 shows the average resistance and average MR ratio of all TMR devices formed in the wafers for the respective samples of Example and Comparative Example as the result of measurement.

TABLE 3

|  | Resistance (Ω) (Average) | MR ratio (%) (Average) |
|---|---|---|
| Example | 26.5 | 7.9 |
| Comparative Example | 20.5 | 5.8 |

As can be seen from Table 3, Example formed with the insulating layer 35*a* and damage reducing layer 35*b* has a higher resistance and MR ratio than the Comparative Example formed with the insulating layer 35 without damage reducing layer, and the barrier layer 26 is not damaged.

While the present invention has been described in connection with the embodiments and examples, the present invention is not limited to them.

For example, while the foregoing embodiments have shown exemplary magnetic heads which employ a magnetic TMR device in the structure described above, the present invention can be applied as well to magnetic heads which employ TMR devices having other structures, other magneto-resistive devices, and the like. Specifically, the present invention can be applied, for example, to a magnetic head which has a CPP structure other than a TMR head such as a CPP-GMR head.

Further, while the foregoing embodiments have shown examples in which the magneto-resistive device according to the present invention is used in a magnetic head, the magneto-resistive device according to the present invention can be applied as well to a variety of other applications (for example, a MRAM or the like).

As described above, the present invention can provide a magneto-resistive device which has improved characteristics by removing a surface oxide film to reduce the resistance while reducing a damage caused by an ion beam, and a magnetic head, a head suspension assembly and a magnetic disk apparatus using the magneto-resistive device.

What is claimed is:

1. A magneto-resistive device comprising:
   a magneto-resistive layer formed on one surface side of a base and including a free layer; and
   a single-layer film formed to be in contact with an effective region effectively involved in detection of magnetism in said magneto-resistive layer without overlapping with said effective region,
   wherein said single-layer film is formed of an insulating material made of an oxide or a nitride including at least one element, the atomic weight of said at least one element being larger than that of silicon,
   said single-layer film excludes a layer for applying a biasing magnetic field to said free layer,
   said single-layer film is in contact with said effective region on at least one side of said effective region, and
   the layer for applying the biasing magnetic field to said free layer is not located on the at least one side of said effective region.

2. A magneto-resistive device according to claim 1, wherein said insulating material is at least one selected from a group consisting of $TiO_2$, $MgO$, $Ta_2O_5$ and $WO_3$.

3. A magnetic head comprising:
   a base; and
   a magneto-resistive device according to claim 2, said magneto-resistive device being supported by said base.

4. A magnetic head comprising:
   a base; and
   a magneto-resistive device according to claim 1, said magneto-resistive device being supported by said base.

5. A magnetic head according to claim 4, wherein said single-layer film is in contact with said effective region on at least one side of said effective region opposite to a magnetic recording medium.

6. A head suspension assembly comprising:
   a magnetic head according to claim 4; and
   a suspension for supporting said magnetic head mounted near a leading end thereof.

7. A magnetic disk apparatus comprising:
   a head suspension assembly according to claim 6;
   an arm for supporting said head suspension assembly; and
   an actuator for moving said arm to position said magnetic head.

8. A magneto-resistive device according to claim 1, wherein said effective region is a region in which a current flows in a direction substantially perpendicular to a film surface of said magneto-resistive layer in said magneto-resistive layer.

9. A magneto-resistive device according to claim 1, further comprising:
   a non-magnetic metal layer having one or more layers formed on said magneto-resistive layer on the side opposite to said base;
   wherein said non-magnetic metal layer is formed such that said non-magnetic layer substantially exactly overlaps with at least the layer in said magneto-resistive layer furthest away from said base.

10. A magneto-resistive device according to claim 1, wherein said magneto-resistive layer includes a tunnel barrier layer formed on one surface side of said free layer, a pinned layer formed on one surface side of said tunnel barrier layer opposite to said free layer, and a pin layer formed on one surface side of said pinned layer opposite to said tunnel barrier layer, and
   said single-layer film is in contact with an end face of said tunnel barrier layer.

11. A magneto-resistive device according to claim 1, wherein said single-layer film does not overlap with the layer for applying the biasing magnetic field to said free layer on the at least one side of said effective region.

12. A magneto-resistive device comprising:
   a magneto-resistive layer formed on one surface side of a base and including a free layer; and
   a composite-layer film formed to be in contact with an effective region effectively involved in detection of magnetism in said magneto-resistive layer without overlapping with said effective region,
   wherein a layer in said composite-layer film being located closest to said base is formed of an insulating material made of an oxide or a nitride including at least one element, the atomic weight of said at least one element being larger than that of silicon,
   said composite-layer film excludes a layer for applying a biasing magnetic field to said free layer,
   said composite-layer film is in contact with said effective region on at least one side of said effective region, and
   the layer for applying the biasing magnetic field to said free layer is not located on the at least one side of said effective region.

13. A magneto-resistive device according to claim 12, wherein said composite-layer film does not overlap with the layer for applying the biasing magnetic field to said free layer on the at least one side of said effective region.

14. A magnetic head comprising:
   a base; and
   a magneto-resistive device according to claim 12, said magneto-resistive device being supported by said base.

15. A magnetic head according to claim 14, wherein said composite-layer film is in contact with said effective region on at least one side of said effective region opposite to a magnetic recording medium.

16. A magneto-resistive device according to claim 12, wherein said insulating material is at least one selected from a group consisting of $TiO_2$, MgO, $Ta_2O_5$ and $WO_3$.

17. A magnetic head comprising:
   a base; and
   a magneto-resistive device according to claim 16, said magneto-resistive device being supported by said base.

18. A magneto-resistive device comprising:
   a magneto-resistive layer formed on one surface side of a base and including a free layer; and
   a composite-layer film formed to be in contact with an effective region effectively involved in detection of magnetism in said magneto-resistive layer without overlapping with said effective region,
   wherein a layer in said composite-layer film being located closest to said base is formed of an insulating material,
   at least one layer in said composite-layer film except for said layer being located closest to said base is made of a predetermined material including at least one element, the atomic weight of said at least one element being larger than that of silicon,
   said composite-layer film excludes a layer for applying a biasing magnetic field to said free layer,
   said composite-layer film is in contact with said effective region on at least one side of said effective region, and
   the layer for applying the biasing magnetic field to said free layer is not located on the at least one side of said effective region.

19. A magneto-resistive device according to claim 18, wherein said predetermined material is at least one selected from a group consisting of P, Ti, V, Cr, Mn, Fe, Co, Ni, Cu, Zn, Ga, Ge, As, Zr, Nb, Mo, Tc, Ru, Rh, Pt, Ag, Cd, In, Sn, Sb, Hf, Ta, W, Re, Os, Ir, Au, Hg, Tl, Pb, Bi, and non-magnetic metals and non-magnetic semiconductors including any one or more of said elements.

20. A magnetic head comprising:
   a base; and
   a magneto-resistive device according to claim 19, said magneto-resistive device being supported by said base.

21. A magnetic head comprising:
   a base; and
   a magneto-resistive device according to claim 18, said magneto-resistive device being supported by said base.

22. A magnetic head according to claim 21, wherein said composite-layer film is in contact with said effective region on at least one side of said effective region opposite to a magnetic recording medium.

23. A magneto-resistive device according to claim 18, wherein said predetermined material is at least one selected from a group consisting of $TiO_2$, MgO, $Ta_2O_5$ and $WO_3$.

24. A magnetic head comprising:
   a base; and
   a magneto-resistive device according to claim 23, said magneto-resistive device being supported by said base.

25. A magneto-resistive device according to claim 18, wherein said composite-layer film does not overlap with the layer for applying the biasing magnetic field to said free layer on the at least one side of said effective region.

26. A magneto-resistive device comprising:
   a magneto-resistive layer formed on one surface side of a base and including a free layer; and
   a single-layer film formed to be in contact with an effective region effectively involved in detection of magnetism in said magneto-resistive layer without overlapping with said effective region,
   wherein said single-layer film is formed of an insulating material made of an oxide or a nitride including at least one element, the atomic weight of said at least one element being larger than that of silicon,
   said single-layer film excludes a layer for applying a biasing magnetic field to said free layer,
   said single-layer film is in contact with said effective region on at least one side of said effective region, and
   said single-layer film does not overlap with the layer for applying the biasing magnetic field to said free layer on the at least one side of said effective region.

27. A magneto-resistive device comprising:
   a magneto-resistive layer formed on one surface side of a base and including a free layer; and
   a composite-layer film formed to be in contact with an effective region effectively involved in detection of magnetism in said magneto-resistive layer without overlapping with said effective region,
   wherein a layer in said composite-layer film being located closest to said base is formed of an insulating material made of an oxide or a nitride including at least one element, the atomic weight of said at least one element being larger than that of silicon,
   said composite-layer film excludes a layer for applying a biasing magnetic field to said free layer,
   said composite-layer film is in contact with said effective region on at least one side of said effective region, and
   said composite-layer film does not overlap with the layer for applying the biasing magnetic field to said free layer on the at least one side of said effective region.

28. A magneto-resistive device comprising:
   a magneto-resistive layer formed on one surface side of a base and including a free layer; and
   a composite-layer film formed to be in contact with an effective region effectively involved in detection of magnetism in said magneto-resistive layer without overlapping with said effective region,
   wherein a layer in said composite-layer film being located closest to said base is formed of an insulating material,
   at least one layer in said composite-layer film except for said layer being located closest to said base is made of a predetermined material including at least one element, the atomic weight of said at least one element being larger than that of silicon,
   said composite-layer film excludes a layer for applying a biasing magnetic field to said free layer,
   said composite-layer film is in contact with said effective region on at least one side of said effective region, and
   said composite-layer film does not overlap with the layer for applying the biasing magnetic field to said free layer on the at least one side of said effective region.

* * * * *